US011125286B2

(12) United States Patent
Fricke et al.

(10) Patent No.: US 11,125,286 B2
(45) Date of Patent: *Sep. 21, 2021

(54) DISC BRAKE FOR A COMMERCIAL VEHICLE AND BRAKE PAD SET

(71) Applicant: KNORR-BREMSE Systeme fuer Nutzfahrzeuge GmbH, Munich (DE)

(72) Inventors: Jens Fricke, Vilshofen (DE); Abdelaziz Rguichi, Olching (DE); Thomas Eichler, Munich (DE); Oliver Krause, Wolfratshausen (DE); Matthias Klingner, Moorenweis (DE); Michael Peschel, Schoengeising (DE); Tobias Schoefberger, Mainburg (DE); Philipp Adamczyk, Stoettwang (DE); Manfred Schoenauer, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 398 days.

This patent is subject to a terminal disclaimer.

(21) Appl. No.: 15/844,194

(22) Filed: Dec. 15, 2017

(65) Prior Publication Data

US 2018/0106309 A1    Apr. 19, 2018

Related U.S. Application Data

(63) Continuation of application No. PCT/EP2016/063610, filed on Jun. 14, 2016.

(30) Foreign Application Priority Data

| Jun. 15, 2015 | (DE) | 10 2015 109 540.8 |
| Oct. 9, 2015 | (DE) | 10 2015 117 285.2 |
| Mar. 17, 2016 | (DE) | 10 2016 104 970.0 |

(51) Int. Cl.
*F16D 55/226* (2006.01)
*F16D 65/00* (2006.01)
(Continued)

(52) U.S. Cl.
CPC ....... *F16D 55/226* (2013.01); *F16D 65/0068* (2013.01); *F16D 65/097* (2013.01);
(Continued)

(58) Field of Classification Search
CPC ........... F16D 55/226; F16D 2055/0029; F16D 65/183; F16D 65/097; F16D 65/0977; F16D 65/16; F16D 65/54; F16D 65/0068
See application file for complete search history.

(56) References Cited

U.S. PATENT DOCUMENTS

| 4,491,204 A | 1/1985 | Dirauf et al. |
| 4,775,033 A | 10/1988 | Heibel |

(Continued)

FOREIGN PATENT DOCUMENTS

| CN | 1232529 A | 10/1999 |
| CN | 101498346 A | 8/2009 |

(Continued)

OTHER PUBLICATIONS

Russian-language Office Action issued in counterpart Russian Application No. 2018100417/11(000531) dated Sep. 28, 2018 with English translation (20 pages).

(Continued)

*Primary Examiner* — Melody M Burch
(74) *Attorney, Agent, or Firm* — Crowell & Moring LLP

(57) ABSTRACT

A disc brake includes a brake caliper that engages over a brake disc and is designed as a sliding caliper. The disc brake has two brake pads which are located in the brake caliper, can be moved in opposite directions and each of which has a pad backing plate with a friction lining secured thereon. An (Continued)

action-side or application-side brake pad of the two brake pads can be pressed against the brake disc by a brake application device with the aid of at least one brake plunger. The brake also includes at least one restoring device, by which the brake caliper can be returned after a displacement and release of the brakes caused by a braking action. The restoring device has a spreading device which engages on the brake pads lying opposite one another and which acts with an identical force in opposition to the respective application direction. The spreading device includes spring-loaded spreading elements, each engaging on its respective pad backing plate. The spreading device is located in the central opening and the spreading elements engage directly or indirectly, outside the friction linings, on at least two contact regions of the brake pads, the regions facing each other at a distance from the center. Each contact region has a contact surface and a support surface, on which surfaces the spreading elements are movably located.

12 Claims, 20 Drawing Sheets

(51) Int. Cl.
    *F16D 65/18*     (2006.01)
    *F16D 65/097*     (2006.01)
    *F16D 65/16*     (2006.01)
    *F16D 65/54*     (2006.01)
    *F16D 55/00*     (2006.01)

(52) U.S. Cl.
    CPC ......... *F16D 65/0977* (2013.01); *F16D 65/16* (2013.01); *F16D 65/183* (2013.01); *F16D 65/54* (2013.01); *F16D 2055/0029* (2013.01)

(56) References Cited

U.S. PATENT DOCUMENTS

| | | | |
|---|---|---|---|
| 5,069,313 A | 12/1991 | Kato et al. | |
| 5,249,647 A * | 10/1993 | Kobayashi | F16D 65/092 188/72.3 |
| 5,251,727 A * | 10/1993 | Loeffler | F16D 55/2265 188/205 A |
| 5,310,024 A * | 5/1994 | Takagi | F16D 65/092 188/72.3 |
| 5,538,103 A | 7/1996 | Rueckert et al. | |
| 5,549,181 A | 8/1996 | Evans | |
| 6,179,095 B1 | 1/2001 | Weiler et al. | |
| 6,283,256 B1 | 9/2001 | Dahlheimer et al. | |
| 6,378,665 B1 * | 4/2002 | McCormick | F16D 65/0975 188/72.3 |
| 6,719,105 B1 * | 4/2004 | Wemple | F16D 65/097 188/205 A |
| 6,920,965 B2 | 7/2005 | Burgdorf et al. | |
| 6,957,724 B2 | 10/2005 | Gherardi et al. | |
| 7,467,693 B2 * | 12/2008 | Barbosa | F16D 65/0973 188/72.3 |
| 8,393,441 B2 | 3/2013 | Gutelius | |
| 8,485,323 B2 | 7/2013 | Narayanan, V | |
| 9,212,710 B2 | 12/2015 | Asakura | |
| 10,563,713 B2 * | 2/2020 | Fricke | F16D 65/097 |
| 10,801,565 B2 * | 10/2020 | Krause | F16D 65/092 |
| 2008/0060888 A1 | 3/2008 | Arakawa | |
| 2010/0000828 A1 | 1/2010 | Pericevic et al. | |
| 2012/0085597 A1 | 4/2012 | Narayanan, V | |
| 2013/0025981 A1 | 1/2013 | Maehara et al. | |
| 2013/0256068 A1 * | 10/2013 | Hazeki | F16D 55/226 188/72.4 |
| 2014/0151166 A1 | 6/2014 | Tironi et al. | |
| 2014/0209418 A1 | 7/2014 | Pahle | |
| 2014/0339026 A1 | 11/2014 | Gutelius et al. | |
| 2014/0367208 A1 | 12/2014 | Miyake et al. | |
| 2015/0008078 A1 | 1/2015 | Asen et al. | |
| 2015/0008079 A1 | 1/2015 | Eichler et al. | |
| 2015/0008080 A1 | 1/2015 | Baumgartner et al. | |

FOREIGN PATENT DOCUMENTS

| | | | |
|---|---|---|---|
| CN | 103714233 A | 4/2014 | |
| CN | 103842681 A | 6/2014 | |
| CN | 104235239 A | 12/2014 | |
| CN | 104271976 A | 1/2015 | |
| CN | 104271978 A | 1/2015 | |
| DE | 25 44 370 A1 | 4/1977 | |
| DE | 30 23 333 A1 | 1/1982 | |
| DE | 43 01 621 A1 | 8/1993 | |
| DE | 44 30 956 A1 | 3/1996 | |
| DE | 10 2007 001 213 A1 | 7/2008 | |
| DE | 10 2009 009 567 A1 | 9/2009 | |
| DE | 10 2008 051 236 A1 | 4/2010 | |
| DE | 10 2012 006 111 A1 | 9/2013 | |
| DE | 10 2012 110 461 A1 | 4/2014 | |
| EP | 2 557 330 A1 | 2/2013 | |
| GB | 574035 A | 12/1945 | |
| GB | 1 491 903 A | 11/1977 | |
| JP | 57-179435 A | 11/1982 | |
| JP | 7-280004 A | 10/1995 | |
| JP | 9-210104 A | 8/1997 | |
| JP | 2008064232 A * | 3/2008 | F16D 65/0977 |
| JP | 2010-270799 A | 12/2010 | |
| JP | 2012-189188 A | 10/2012 | |
| RU | 2 549 594 C2 | 4/2015 | |
| SU | 1831609 A3 | 7/1993 | |
| WO | WO 96/08663 A1 | 3/1996 | |

OTHER PUBLICATIONS

International Search Report (PCT/ISA/210) issued in PCT Application No. PCT/EP2016/063610 dated Oct. 27, 2016 with English translation (Six (6) pages).

German-language Written Opinion (PCT/ISA/237) issued in PCT Application No. PCT/EP2016/063610 dated Oct. 27, 2016 (Nine (9) pages).

Chinese-language Office Action issued in counterpart Chinese Application No. 201680042233.5 dated Nov. 30, 2018 with English translation (19 pages).

Japanese-language Office Action issued in counterpart Japanese Application No. 2017-564455 dated Jul. 3, 2019 with English translation (14 pages).

Portuguese-language Office Action issued in Brazilian Application No. BR112017026082-4 dated Jul. 30, 2020 with partial English translation (six (6) pages).

Japanese-language Office Action issued in Japanese Application No. 2017-564455 dated Jul. 1, 2020 with English translation (five (5) pages).

* cited by examiner

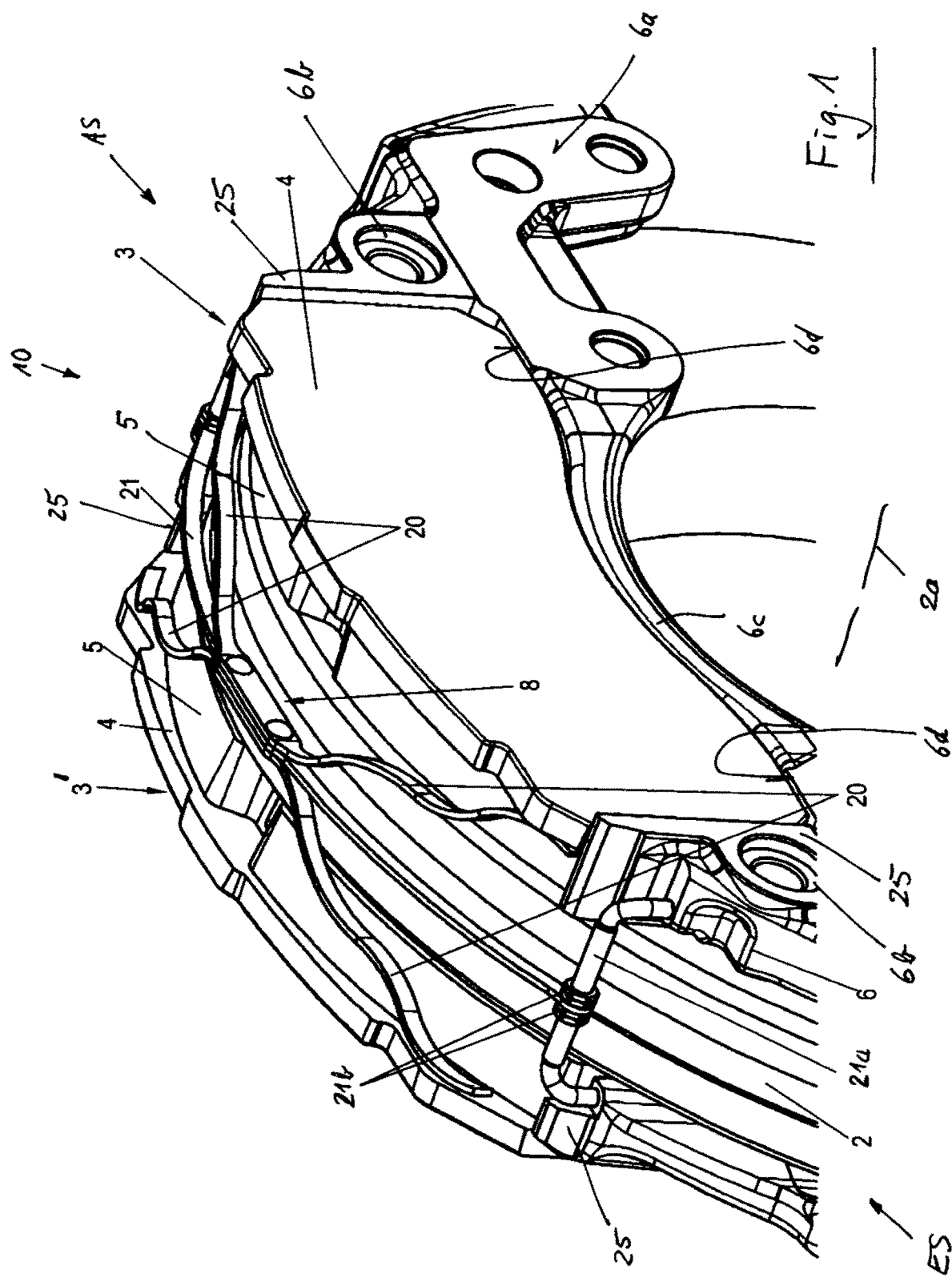

DISC BRAKE FOR A COMMERCIAL VEHICLE AND BRAKE PAD SET

CROSS REFERENCE TO RELATED APPLICATIONS

This application is a continuation of PCT International Application No. PCT/EP2016/063610, filed Jun. 14, 2016, which claims priorities under 35 U.S.C. § 119 from German Patent Applications Nos. 10 2015 109 540.8, filed Jun. 15, 2015, 10 2015 117 285.2, filed Oct. 9, 2015, and 10 2016 104 970.0, filed Mar. 17, 2016, the entire disclosures of which are herein expressly incorporated by reference.

BACKGROUND AND SUMMARY OF THE INVENTION

The invention relates to a disc brake for a commercial vehicle and also relates to a brake pad set.

In the case of a generic disc brake, also known as a sliding-caliper brake, in a braking situation, an action-side brake pad is pressed against a vehicle-side brake disc by way of an application device, which is actuable pneumatically or by electric motor. During the further course of the braking process, the brake caliper is, relative to the brake disc, displaced counter to the application direction of the action-side brake pad, causing the opposite, reaction-side brake pad to be driven along and pressed against the other side of the brake disc.

In the case of the known disc brake, after a release of the brake, the brake caliper remains in said position, in which the brake pads, or at least the reaction-side brake pad, lies against the brake disc duly without pressure but with a rubbing action. The residual rubbing torques of the brake pads that thereby arise during driving operation have a disadvantageous effect because they lead to increased fuel consumption and to a reduction of the service life of the components involved, specifically of the brake disc and of the brake pads.

It is duly the case that the brake pads are released slightly during driving operation for example as a result of a wobbling movement of the brake disc and as a result of vibrations and lateral accelerations during cornering. These effects are however not sufficient to prevent said residual rubbing torques in an effective manner.

To counteract this problem, the generic DE 10 2007 001 213 discloses a disc brake having a resetting device which is arranged in one of the guide beams by way of which the brake caliper is displaceably held on the brake carrier, which resetting device has a resilient resetting element by means of which the brake caliper is displaced into an initial position.

This construction has proven successful in principle. However, the use of said known resetting device can lead to problems in the case of compressed-air-actuated disc brakes of heavy commercial vehicles, because here, there are wide-ranging influences resulting from component tolerances and component deformations, which have the effect that reliable functioning of said resetting device is not permitted in all situations.

Similar problems arise in the case of a disc brake such as that to which DE 10 2012 006 111 A1 relates. Here, a resetting device is arranged on the side which is situated opposite the application device and which faces toward the reaction-side brake pad, whereby effective, in particular automatic resetting of the brake caliper is realized, with a simultaneously minimal effect on the system rigidity.

In any case, the resetting device acts on the brake caliper, wherein the brake carrier functions as a counterbearing.

DE 43 01 621 A1 describes a floating-caliper disc brake having a positionally static brake carrier which has two carrier arms which project over the outer edge of a brake disc, having brake shoes which are arranged on both sides of the brake disc and which have in each case one friction pad and one rear plate and which are supported displaceably on the carrier arms, having a floating caliper which is guided axially displaceably on the brake carrier and which engages around the brake shoes and has an actuating device designed for pressing the brake shoes against the brake disc, having a spring arrangement which acts axially on the brake shoes in a brake release direction and which, after the braking operation, assists in the setting of an air gap between the brake shoes and the brake disc. The spring arrangement has at least one spreading spring which is fastened in altogether non-displaceable fashion in an axial direction to a carrier arm of the brake carrier, in that the fastening is performed to a section of the carrier arm situated over the outer edge of the brake disc, and in that the spreading spring has at least two spring arms which lie resiliently in an axial direction against the rear plates of the brake shoes.

US2014/0339026 A1 describes a spreading spring comprising a locking arm which connects the spreading spring to a brake component, a retraction arm; and a preload device which is arranged between the locking arm and the retraction arm, wherein the preload device comprises six or more spiral-shaped loops which store energy during a braking activation and which retract the brake components (brake pad) as soon as the braking process has ended. A brake caliper in the form of a floating caliper, which is not a sliding caliper, is specified. This is suitable for a passenger vehicle but not for a commercial vehicle.

The invention is based on the object of further developing a disc brake of the generic type such that, with the simplest structural means, the service life in particular of the brake pads and of the brake disc is lengthened, and the operating costs are altogether lowered.

A further object consists in providing a corresponding brake pad set.

Said object is achieved by way of a disc brake according to embodiments of the invention.

The further object is achieved by way of a brake pad set according to embodiments of the invention.

A disc brake according to the invention for a commercial vehicle, having a brake caliper which engages over a brake disc and which is in the form of a sliding caliper and which is fastened to a positionally static brake carrier and which has a central opening over the brake disc, comprises two brake pads which are arranged in the brake caliper and which are movable in opposite directions and which have in each case one pad carrier plate and one friction pad fastened thereto and of which an action-side or application-side brake pad can be pressed against the brake disc by way of an application device via at least one brake plunger, and comprises at least one resetting device by means of which the brake caliper can be reset after a braking-induced displacement and release of the brake, wherein the resetting device has a spreading device which engages on the opposite brake pads and which acts equally counter to the respective application direction and which has resilient spreading elements which engage on the respective pad carrier plate. The spreading device is arranged in the central opening, wherein the spreading elements engage, outside the friction pads, directly or indirectly on at least two abutment regions, arranged spaced apart from one another relative to the center, of the brake pads, wherein the abutment regions have in each case one abutment surface and one bearing surface on which the spreading elements are movably arranged.

By means of the design of the disc brake according to the invention, synchronous resetting of both brake pads and resetting of the brake caliper when the brake is released are realized, wherein the synchronicity relates both to the resetting forces and to the resetting travels. Here, the resetting force acts counter to the respective application direction of the two brake pads, that is to say, in the case of the reaction-side brake pad, toward the caliper rear section, and in the case of the action-side brake pad, toward the caliper head, with gaps with respect to the brake disc being formed.

The spreading device expediently engages on the two brake pads at the pad carrier plates, specifically on the side facing toward the friction pad fastened thereto or on the opposite rear side. To prevent jamming of the respective brake pad during the resetting movement, the spreading element engages either centrally on an upper exposed edge region of the pad carrier plate or symmetrically on two abutment regions to the right and to the left.

A brake pad set according to the invention for the disc brake according to the invention has at least two brake pads with in each case one pad carrier plate and with a friction pad attached to the pad carrier plate, and has the spreading device as indicated above. The pad carrier plate have, outside the friction pads and on one side in the center region or at at least two abutment regions arranged spaced apart from one another relative to the center, in each case one abutment surface and one bearing surface. This yields the advantage that multiple functions (axial and radial transmission of spring force, spring end guidance) are realized in a small space.

In one embodiment, the spreading elements extend, proceeding from a central region in the center of the opening, from the inside to the outside to the abutment regions which are arranged spaced apart from one another relative to the center. It is also possible for the spreading elements to extend, proceeding from a central region in the center of the opening, from the inside to the outside to the abutment regions which are arranged spaced apart from one another uniformly relative to the center.

In this way, the spreading device is arranged in the center in the brake caliper, wherein said spreading device is likewise arranged within an envelope of a wheel rim of an associated wheel.

The two spreading elements are connected to one another in the center (in relation to the carrier horns). It is thus possible to ensure a spring force which is identical—in a small tolerance range—both on the run-in side and on the run-out side. Different spring forces between run-out side and run-in side, which can lead to oblique wear, are minimized by way of the unilateral engagement of in each case one spring per pad.

A further embodiment provides that the central region of the opening extends to both sides of a virtual center of the opening approximately parallel to the plane of the brake disc over a length in a range from 30 to 50% of a longitudinal axis of the opening. This yields an advantageous adaptation of the spring forces.

In another embodiment, the spreading device has spring arms, of which in each case two lie against an associated pad carrier plate, wherein the spring arms are connected to one another in the central region of the opening, which simplifies installation during assembly and maintenance work.

According to a further concept of the invention, the spreading device has oppositely acting spreading elements, preferably with elastic action, in particular in the form of spring elements.

According to one concept of the invention, the spreading device is operatively connected to the brake carrier, which forms a counterbearing and in which the brake pads are mounted so as to be displaceable coaxially with respect to the brake disc.

For this purpose, a retaining bow is provided which extends over the brake disc in the circumferential region as far as brake carrier horns which delimit a pad slot on both sides, which retaining bow is, in relation to the thickness of the brake disc, arranged in the center relative to said brake disc. The retaining bow is not a pad retaining stirrup, but is an additional component.

In one embodiment, the retaining bow may be attached to two mutually oppositely situated stirrups which are connected to the brake carrier, which permits simple attachment.

Alternatively, the retaining bow may be connected to at least the two brake carrier horns of a pad slot, whereas the spreading elements, which engage on the two brake pads, are connected to the retaining bow. Said retaining bow thus forms a centering device which, in correspondence with the brake carrier as a fixed bearing, may also be realized in some other way in terms of construction.

The retaining bow is preferably of C-shaped form in terms of its contour, with a center limb which extends over the brake disc to the extent mentioned and with two end limbs which are angled in the same direction as said center limb toward the brake carrier horns and of which in each case one is fastened to a brake carrier horn of the corresponding pad slot.

Alternatively, the end limbs may have in each case one lug, into which the pegs of the brake carrier horns are inserted. Simple installation is thus achieved. The pegs may self-evidently also be inserted separately into the brake carrier horns beforehand, wherein the lugs have corresponding holes.

By way of the retaining bow to which the spreading device is fastened by way of its spring arms, automatic centering of the brake caliper after a release of the brake, that is to say after the ending of a braking process, is realized, wherein, by way of the thus fixed positioning of the spreading device, the brake pads are reset such that the brake caliper is centered relative to the brake disc.

Furthermore, the spreading device is designed so as to act over the entire range of wear of the brake pads.

Since the points of force engagement on the brake pads change with progressive wear, those functional parts of the spreading device which make contact with the brake pads are designed so as to be supported in sliding fashion on the pad carrier plate of the respective brake pads.

To ensure secure retention of the spring limbs, or, in the case of a different design variant, of the spring arms, even under the action of vibrations during driving operation, the spring arms are supported on the upper edge of the pad carrier plate in relation to the base of the pad slot, likewise in sliding fashion as described above.

With corresponding design of the spreading device, it is moreover possible to dispense with the use of pad retaining springs, which, as is known from the prior art, are fastened to the upper edge of the pad carrier plates and on which a pad retaining stirrup is supported, such that the respective brake pad is retained under preload in the pad slot of the brake carrier.

The structural realization of the spreading device according to the invention may differ in terms of construction, wherein a major advantage emerges from the fact that it is possible to substantially dispense with moving components, self-evidently with the exception of the resilient spreading elements which, for their function, perform a resilient deflection.

The omission of moving parts that is now possible self-evidently has the effect of lengthening the service life of the spreading device, as does the low number of components required, resulting, moreover, in extremely inexpensive production and assembly.

In a further embodiment, the spring arms may be formed as two pairs of spring arms, wherein the pairs are arranged opposite one another in a transverse direction of the opening such that they are fastened by way of inner ends, which point toward the center of the opening, to the retaining bow, wherein their outer free ends interact with the pad carrier plate of the brake pads. This yields a compact and effective construction.

Here, it is preferably possible for the inner ends of each pair of spring arms to be connected in each case to a hood-type connector of sleeve-like form, wherein the hood-type connector are bent around a central section of the retaining bow and are attached rotatably and displaceably to the central section, which has a circular cross section. In this way, the spring arms are advantageously arranged as pairs, so as to be movable independently of one another, on the retaining bow.

In a further refinement, each spring arm may be formed, at the end, with a thrust section which, in its longitudinal direction, is formed with an elongated hole which is a guide section of the spring arm of the spreading device. In this way, a further relative movement capability can be achieved.

Furthermore, here, each thrust section may lie in each case on a bearing surface of a respective pad carrier plate, wherein the elongated holes of each thrust section interact in each case with an abutment surface of the pad rear plate. This yields advantageous guidance in a radial direction.

For improved further guidance, a pin fixedly connected to the pad carrier plate is provided, which pin has the abutment surface, which interacts with the respective elongated hole, of the pad carrier plate, wherein the bearing surfaces run in each case tangentially with respect to the brake disc and lie in a plane.

The spreading device comprises two spreading elements, wherein a first spreading element acts on a first pad and a second spreading element acts on a second pad. The two spreading elements are connected to one another in the center (in relation to the carrier horns). It is thus possible to ensure a spring force which is identical—in a small tolerance range—both on the run-in side and on the run-out side. Different spring forces between run-out side and run-in side, which can lead to oblique wear, are minimized by way of the unilateral engagement of in each case one spring per pad.

A uniform application of force by the springs on the action side and on the reaction side, or on the thrust-piece side and on the caliper side, can be realized by way of a flexible adjustment of the center web. Furthermore, it is possible for slight incorrect geometrical positioning of disc, pad and carrier to be compensated by way of the flexible center web.

By way of the center web, it is possible for the active resetting device to be easily positioned and held down by the pad retaining stirrup. It is advantageously possible, during a pad change, for the resetting device to be easily removed and also exchanged.

Through the utilization of the entire pad slot between the carrier horns, it is possible for use to be made of spreading elements or springs with a relatively low spring rate in order to impart relatively constant forces in the event of pad wear. Owing to the long spring travels, the spring elements can be tolerant with regard to spring forces. The spring travels lead to a constant spring rate with low tolerances.

In a preferred design variant, only two springs are used.

The spreading elements may be formed from inexpensive and geometrically flexible metal sheets.

As a result of the offset with different centers of rotation, it is possible to replicate a relatively low spring rate. There is advantageously no need for a large number of windings (expensive, bulky).

Further advantages are:

Adjustability (of the centering)

Spring constants adaptable for each pad side, hence different for inside/outside and better adaptable to surroundings—within limits Installation by way of center centering stirrup—compensates uneven force build-up Possible "active" caliper centering Active pad suspension by way of "fork" on the end of the spider A further embodiment provides that the spreading device has at least one additional resetting element which, in addition to the engagement point/the engagement points of the spring arms, engages at a further engagement point on the respective carrier plate of a brake pad. This is advantageous because, in this way, an assisted resetting of the brake pads can be effected. A residual rubbing torque can thereby be prevented.

In one embodiment, the at least one resetting element may be fastened by way of one section, in a lower region of the pad carrier plate of an application-side brake pad on a thrust side of the pad carrier plate, to a retaining peg, wherein the at least one resetting element is fastened by way of a further section in a lower region of a base plate of an application section of the brake caliper. In this way, it is advantageously possible for a pulling force to be exerted on the brake pad by the resetting element.

Here, the at least one resetting element may be formed as a spring element with a central section, two spring arms and two fastening sections with in each case one U-shaped lug, wherein the central section is fastened to the retaining peg of the pad carrier plate, and wherein each spring arm is attached by way of the fastening section to the base plate. This is a simple and compact design. The fastening to the pad carrier plate can be performed quickly and easily for example by means of a claw-type connection to a pin of the pad carrier plate.

In one variant, the central section and the spring arms of the resetting element may be formed from a spring wire, wherein the central section is fastened to a retainer in a lower region of the pad carrier plate. This advantageously yields a weight saving.

In an alternative embodiment, the at least one resetting element may comprise a first spring arm with a clamping end and with a connection, a second spring arm with a connection, and a fastening section with an opening, wherein the first spring arm is, on the thrust side of the pad carrier plate of the application-side brake pad, fastened by way of its clamping end to a retainer, wherein the second spring arm is connected by way of a connection to the first spring arm and is arranged parallel to the latter, and wherein the fastening section is, with its opening in front of an opening of a bearing receptacle of the brake carrier, fastened coaxially with respect to the latter between the brake carrier and a bearing beam of the brake caliper. Simple positionally static fixing between existing components can thus be made possible.

In a yet further alternative, the at least one resetting element may be arranged centrally as a central resetting element in a vertical direction on the thrust side of the pad carrier plate of the application-side brake pad and is fastened both to the top side and to the bottom side of the pad carrier plate, wherein a positionally static fixing of one end of the central resetting element is formed centrally on an application-side bridge connector of the brake carrier.

Different variants may be designed for this purpose. For example, the at least one central resetting element may have two lateral longitudinal members which are arranged parallel to one another and the upper ends of which, as gripping sections, engage fixedly as clips around the top side of the pad carrier plate, wherein the two longitudinal members are equipped, at their bottom ends, with gripping sections which engage fixedly as clips around the bottom side of the pad carrier plate, wherein the longitudinal members are connected in their upper region by means of a transverse connector, and are connected in their lower region in each case by means of a transverse connector to in each case one further longitudinal member, wherein the two longitudinal members extend in each case upward parallel to the outer longitudinal members and are connected at their upper ends by means of a transverse connector to which there is attached a central longitudinal member, which central longitudinal member extends downward parallel to the other longitudinal members beyond the gripping sections and ends in a dedicated gripping section which is fixed to the application-side bridge connector of the brake carrier. This permits particularly simple installation without additional components.

A further variant provides that the at least one resetting element is arranged centrally as a central resetting element in a vertical direction on the thrust side of the pad carrier plate of the application-side brake pad and is fastened in a region of the bottom side of the pad carrier plate, wherein a positionally static fixing of one end of the central resetting element is formed on an application-side retaining end of a pad retaining stirrup.

Here, the at least one central resetting element may have a spring body of wire form with two longitudinal members arranged parallel to one another, wherein the longitudinal members are connected by means of a transverse connector, wherein the transverse connector is retained in the lower region of the pad carrier plate, and end sections of the longitudinal members of the spring body are attached by means of a retainer to the application-side retaining end of the pad retaining stirrup. This construction is simple and lightweight.

An alternative to this provides that the at least one central resetting element has a spring body of wire form with two longitudinal members arranged parallel to one another, wherein the longitudinal members are connected by means of a transverse connector, wherein the transverse connector is retained by means of a retainer, and end sections of the longitudinal members of the spring body are retained in the lower region of the pad carrier plate.

Also, in a yet further alternative to this, the at least one central resetting element may have a spring body of wire form with a first end section and with a fastening section, wherein the end section is retained in the lower region of the pad carrier plate and the fastening section is attached to the application-side retaining end of the pad retaining stirrup.

The at least one central resetting element may however also have a spring plate with an end section and with a fastening section, wherein the end section is retained in the lower region of the pad carrier plate and the fastening section is attached to the application-side retaining end of the pad retaining stirrup.

With these variants, a particularly advantageous adaptation to different usage situations with different spring forces is possible.

In yet another embodiment, the at least one resetting element may be fastened by way of one section in a lower region of the pad carrier plate of the rear-side brake pad on the thrust side of the pad carrier plate, wherein the at least one resetting element interacts by way of a further section with a brake carrier horn of the positionally static brake carrier. In this way, the rear-side brake pad can also be easily equipped with a suitable resetting element.

Here, the resetting element may comprise a central section with two connecting sections, two spring arms with in each case one spring end, two further connecting sections and two further spring arms with in each case one clip end, wherein the central section is arranged, with the connecting sections attached thereto on the left and on the right and with the spring arms attached thereto in each case, in a lower edge region on the thrust side of the pad carrier plate, wherein the further connecting sections are arranged in the lower corner regions on the thrust side of the pad carrier plate and are connected to the further, vertical spring arms which extend in each case in a side region on the thrust side of the pad carrier plate, wherein the clip ends of each further spring arm are fastened, so as to engage over an oblique side section, to the pad carrier plate, and wherein the spring ends are in each case in contact with a brake carrier horn. Here, it is advantageous that the resetting element can be easily attached to the pad carrier plate by means of clips.

In a yet further embodiment, it is provided that the spreading device has at least one further additional resetting element, which is arranged between the bottom side of the pad carrier plate of the rear-side brake pad and a caliper rear section of the brake caliper. It is thus possible for the rear-side brake pad to be reset, with assistance from the further resetting element, in order to prevent a residual rubbing torque.

Here, the at least one further resetting element may be formed as a type of leaf spring with a spring body with in each case one spring end, wherein one spring end is articulated, in a lower region of the rear-side pad carrier plate on the thrust side thereof, on a holding section, and the other spring end is articulated on a fastening section of the caliper rear section of the brake caliper. In this way, a pulling force can also be exerted on the rear-side brake pad.

In an alternative embodiment, the spreading device has at least one additional resetting element with two mutually oppositely situated spring arms, wherein each spring arm is attached by way of its upper end in each case to a central section via a connecting bend, wherein the central section of the resetting element is fastened to a central section of the retaining bow of the spreading device, and wherein in each case one free end of each spring arm is in contact, by way of in each case one thrust-imparting limb, with the respective pad carrier plate of each brake pad. This yields a simple construction, wherein a thrust force is exerted on each brake pad by a respective resetting element in order to assist a resetting of the brake pads.

For this purpose, it may be provided that the at least two additional resetting elements are arranged in each case in an elongate intermediate space between a friction pad and a pad side of the respective pad carrier plate, wherein the thrust-imparting limbs are in each case in contact with the pad side of the respective pad carrier plate and each exert a thrust force on the brake pad in a direction pointing away from the brake disc. This is advantageous because the brake pads are not modified, or are modified only to a very small extent.

A further embodiment provides that, in the lower region of each pad carrier plate, there is provided at least one guide element which has a fastening section and, fastened thereto, a guide section with a bearing section, wherein the at least one respective guide element is fastened to the fastening section on the thrust side of the respective pad carrier plate such that the respective bearing section lies on the respective pad slot base. Thus, tilting of the brake pads during the resetting movement can be advantageously prevented, because a bearing surface of the brake pads in the pad slots can be enlarged by means of the guide elements.

In a further embodiment, the pad carrier plate of an application-side brake pad may be equipped with at least one resetting element. A coding may be possible in this way also.

Accordingly, the pad carrier plate of a rear-side brake pad may also be equipped with at least one resetting element.

One embodiment of the brake pads provides that in each case one elongate intermediate space is arranged between a friction pad and a pad side of the respective pad carrier plate, whereby simple contacting for the spring arms of further resetting elements is realized.

In a further embodiment, the pad carrier plates may be equipped, in the lower region on their thrust sides, with at least one guide element, whereby tilting can be advantageously prevented or significantly reduced.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1, 1A and 2 show perspective views of an exemplary embodiment of a disc brake according to the invention with a resetting device;

The expressions "top", "bottom", "left", "right" relate to the respective arrangements in the figures.

A "top side" and a "bottom side" of a brake pad 3, 3' or of a pad carrier plate 4 always relate to the installation situation of the respective brake pad 3, 3'. Here, the bottom side of the respective brake pad 3, 3' is situated closer in a radial direction to a brake disc axis of rotation 2a than the top side of said brake pad 3, 3', as can be clearly seen for example from FIG. 11.

DETAILED DESCRIPTION OF THE DRAWINGS

Figure 1A:
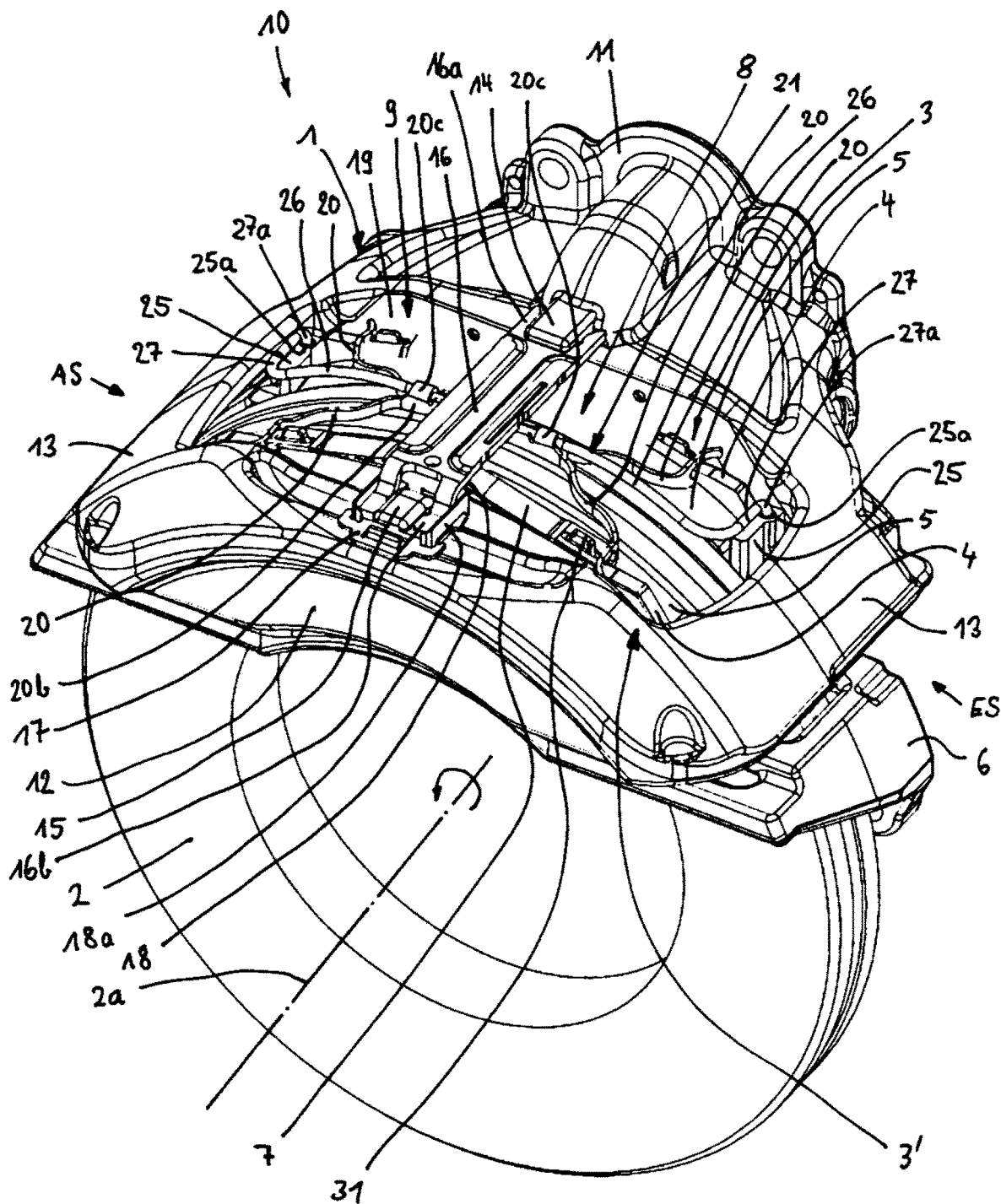
Figure 2:
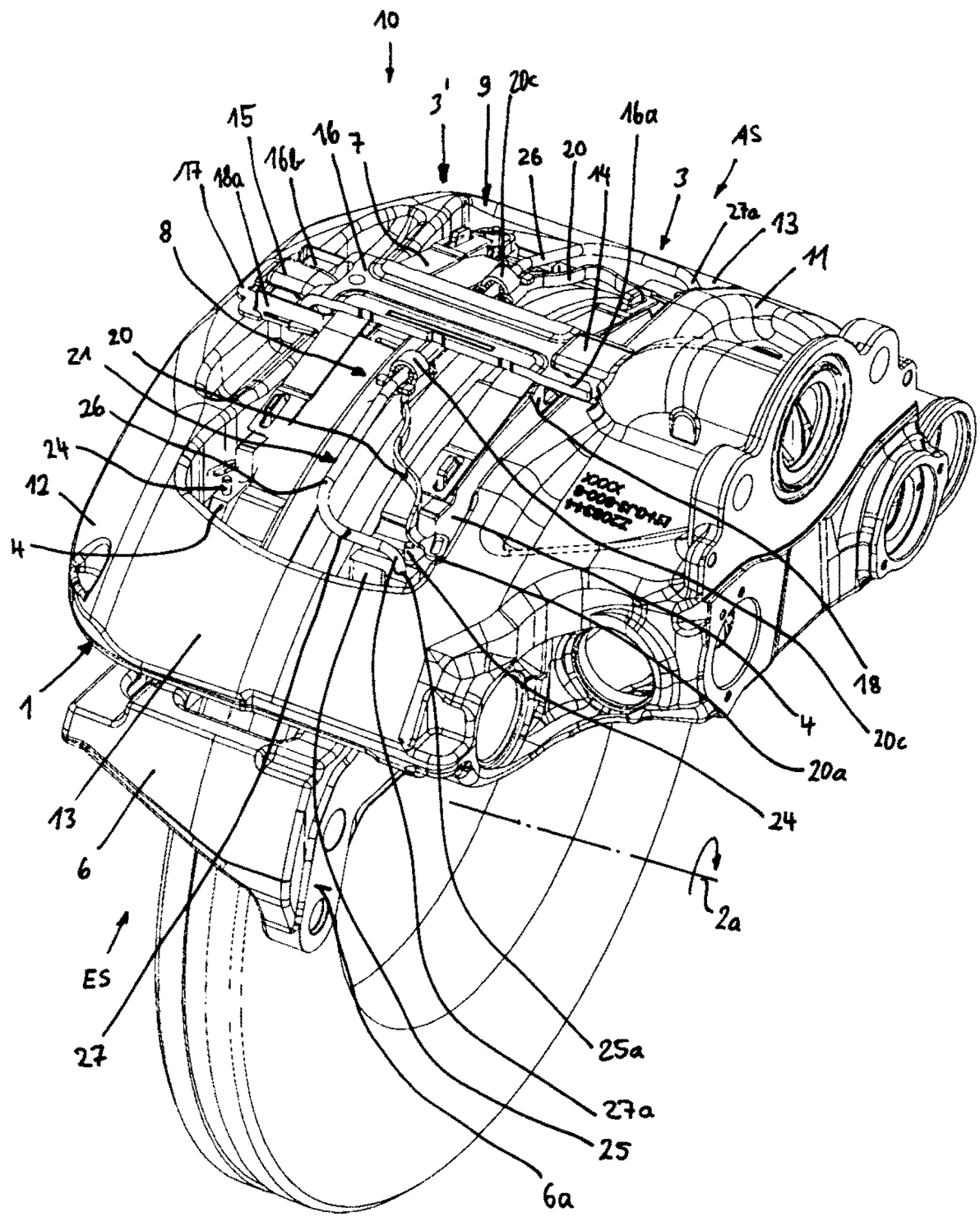

FIGS. 1, 1A and 2 show perspective views of exemplary embodiments of a disc brake 10 according to the invention with a resetting device, from different viewing angles from above.

A brake caliper 1 engages over a brake disc 2 with a brake disc axis of rotation 2a. The brake caliper 1 is attached, displaceably relative to the brake disc 2 axially in the direction of the brake disc axis of rotation 2a, to a brake carrier 6, for which purpose the brake caliper 1 is mounted on guide beams (not illustrated) which are connected to the brake carrier 6 which is held in positionally static fashion on the vehicle.

FIG. 1 shows the brake carrier 6, with the brake disc 2, the brake disc axis of rotation 2a of said brake disc and brake pads 3, 3', in a view from an application side. A fastening side 6a of the brake carrier 6 is connected to a positionally static component (not shown) of an associated vehicle. Furthermore, the brake carrier 6 has bearing receptacles 6b for the guide beams (not illustrated) for the mounting of the brake caliper 1 and has an application-side, curved bridge connector 6c.

Also illustrated in FIG. 1 is a spreading device 8 with four spring arms 20 and with a retaining bow 21. Here, the spreading device 8 is composed of two identical spring arms 20, which are connected to one another in the central region, and to a retaining bow 21, which is fastened by means of stirrups 21a to the brake carrier 6, specifically to the brake carrier horns 25. For the axial securing of the retaining bow 21, securing means 13 are provided on the stirrup 12 so as to clamp the respective end of the retaining bow 21 between them.

Here, the spring arms 20 lie against two mutually oppositely situated end regions of the pad carrier plate 4, specifically in an edge region that protrudes at the top side. The ends of the spring arms 20 are likewise curved, such that sliding on the pad carrier plate surface during the application and release of the brake is possible without problems. Here, spreading of the brake pads 3, 3' after a release of the brake is possible by way of the preload that is generated during the application movement.

The spreading device 8 will be discussed in detail below in a further embodiment.

The brake caliper 1 comprises an application section 11, a caliper rear section 12 and two tension struts 13. The application section 11 runs with one side parallel to the plane of the brake disc 2 on one side of the brake disc 2. The caliper rear section 12 is arranged on the other side of the brake disc 2, likewise so as to run parallel to the brake disc 2. The caliper rear section 12 is connected to the application section 11 at in each case one end by way of in each case one tension strut 13. Here, the tension struts 13 run substantially at right angles to the application section 11 and to the caliper rear section 12.

The application section 11 has an interior space in which an application device (not shown in this figure; see application device having plunger 75 in FIG. 6) of the disc brake 10 is arranged. An opening of the interior space points toward the brake disc 2 and is closed off by means of a plate, which is referred to as base plate 19 (see FIG. 1).

In this arrangement, the application section 11, the caliper rear section 12 and the tension struts 13 define, between them, a central opening 9 which extends over the brake disc 2. The opening 9 has an imaginary longitudinal central line which lies in the plane of the brake disc 2 and which connects the imaginary centers of the tension struts 13. Furthermore, the opening 9 has a further imaginary transverse central line which connects an imaginary center of the application section 11 to an imaginary center of the caliper rear section 12. The longitudinal central line and the transverse central line intersect at an imaginary center point, which in this case is referred to as the virtual center of the opening 9.

In the brake carrier 6, brake pads 3, 3' are arranged in the so-called pad slots between the respective two brake carrier horns 25 and lie with sections of the bottom sides thereof on the respective pad slot base 6d. This can be clearly seen in FIG. 1. The brake pads 3, 3' can, during a braking operation, be pressed against the brake disc 2 at both sides. Here, each brake pad 3, 3' has a pad carrier plate 4 and, on the side facing toward the brake disc 2, a friction pad 5 fastened to said pad carrier plate on a pad side 4a (see FIG. 4), which friction pad is, during the functional operation thereof, that is to say during a braking operation, pressed against the brake disc 2. The other side of the pad carrier plate 4 will hereinafter be referred to as thrust side 4b (see also FIG. 4).

The brake pads 3, 3' are accessible, for an exchange and for maintenance, through the central opening 9. Said brake pads can, through said central opening 9, be inserted into their associated pad slots and removed from said pad slots again. The pad slots are defined in each case laterally by brake carrier horns 25, wherein the brake pads 3, 3' stand in each case with partial sections of their bottom sides on a pad slot base 6d (see FIG. 11).

A rotation arrow about the brake disc axis of rotation 2a indicates a main direction of rotation for forward travel of a vehicle to which the disc brake 10 is assigned. A run-in side ES and, opposite, a run-out side AS, of the disc brake 10 are defined in relation to the main direction of rotation of the brake disc 2. Accordingly, the brake carrier horns 25 on the run-in side ES are referred to as run-in-side brake carrier horns 25, and those on the run-out side AS are referred to as run-out-side brake carrier horns 25.

A pad retaining stirrup 16 is arranged over the brake pads 3, 3' in a transverse direction of the opening 9 and, in the direction of the brake disc axis of rotation 2a, between the application section 11 and the caliper rear section 12. An application-side retaining end 16a of the pad retaining stirrup 16 is fastened, in a retaining section 14, to the application section 11 of the brake caliper 1, wherein an oppositely situated, rear-side retaining end 16b of the pad retaining stirrup 16 is fixed to a retaining section 15 of the caliper rear section 12. The rear-side retaining end 16b of the pad retaining stirrup 16 is furthermore fastened by means of a clip 18a of a clip element 18 attached to the rear-side brake pad 3', and is secured against release by means of a securing element 17 (not described in any more detail).

Here, the pad retaining stirrup 16 presses, by way of sections of its bottom side, against the clip elements 18 of the two brake pads 3, 3' and thus also against their pad retaining springs 7, whereby the brake pads 3, 3' are held in their pad slots. The pad retaining springs 7 are in each case retained on the pad carrier plates 4 on projections 31.

Braking is performed by way of the application device arranged in a receiving space in the application section 11 of the brake caliper 1, which application device has, for example, a brake lever which is positioned in a dome of the brake caliper 1. The associated brake pad 3, referred to as action-side or application-side brake pad, is the first to make contact with the brake disc 2 during a braking operation. During the further course of the braking operation, reaction forces that occur cause the brake caliper 1 to be displaced in the opposite direction, driving the reaction-side brake pad 3, 3' along until the latter likewise comes into frictional contact with the brake disc 2. The reaction-side brake pad 3' is also referred to as rear-side brake pad, and will hereinafter be distinguished from the application-side brake pad 3 by the reference designation 3'.

After a release of the brake, the two mutually oppositely situated brake pads 3, 3' are, by way of the resetting device, released from the brake disc 2 to such an extent that said brake disc runs freely relative to the brake pads 3, 3'.

Figure 3:
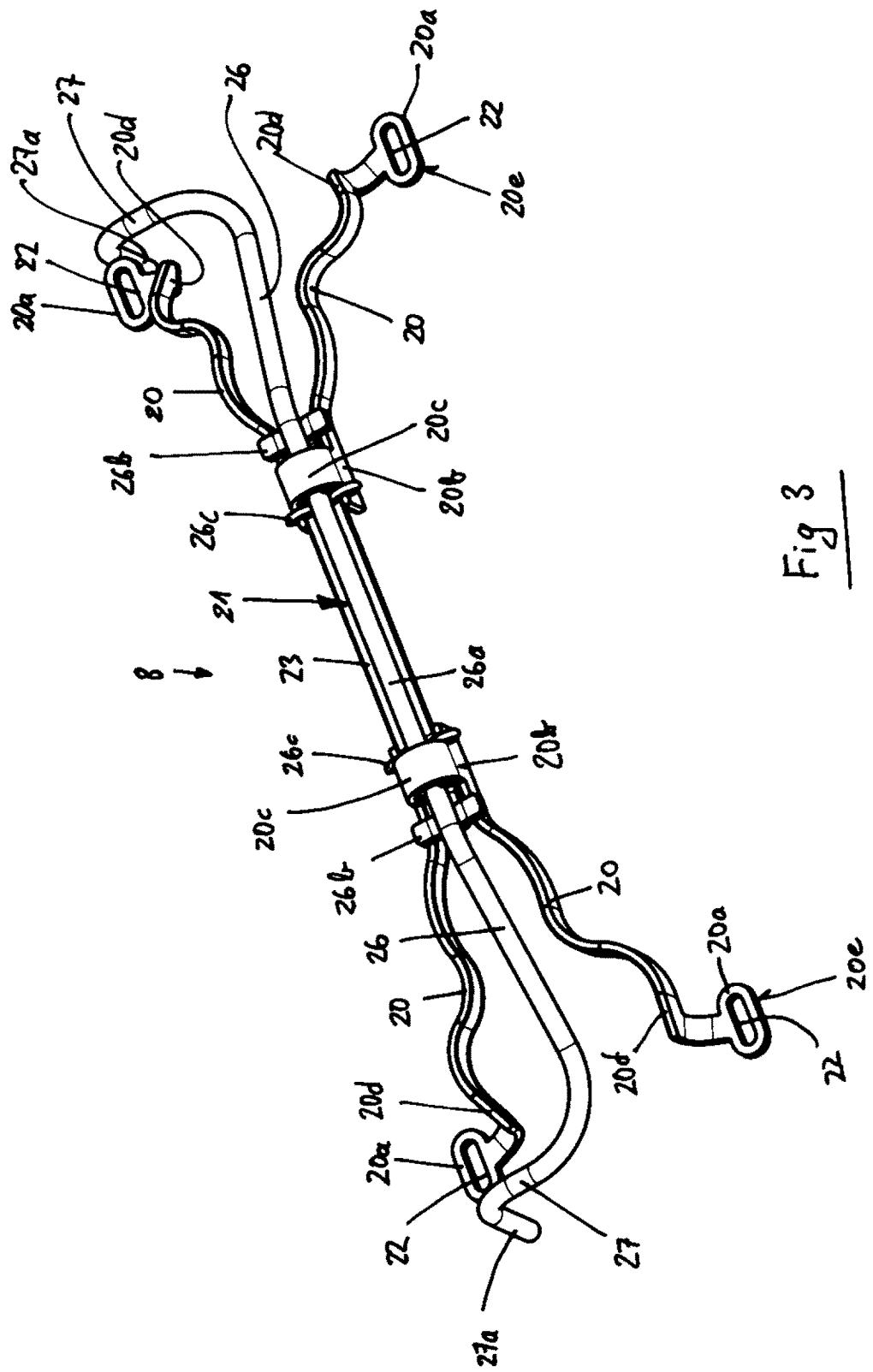
FIG. 3 shows a perspective view of a first function group of the resetting device of the exemplary embodiment of the disc brake as per FIG. 1.
Figure 4:
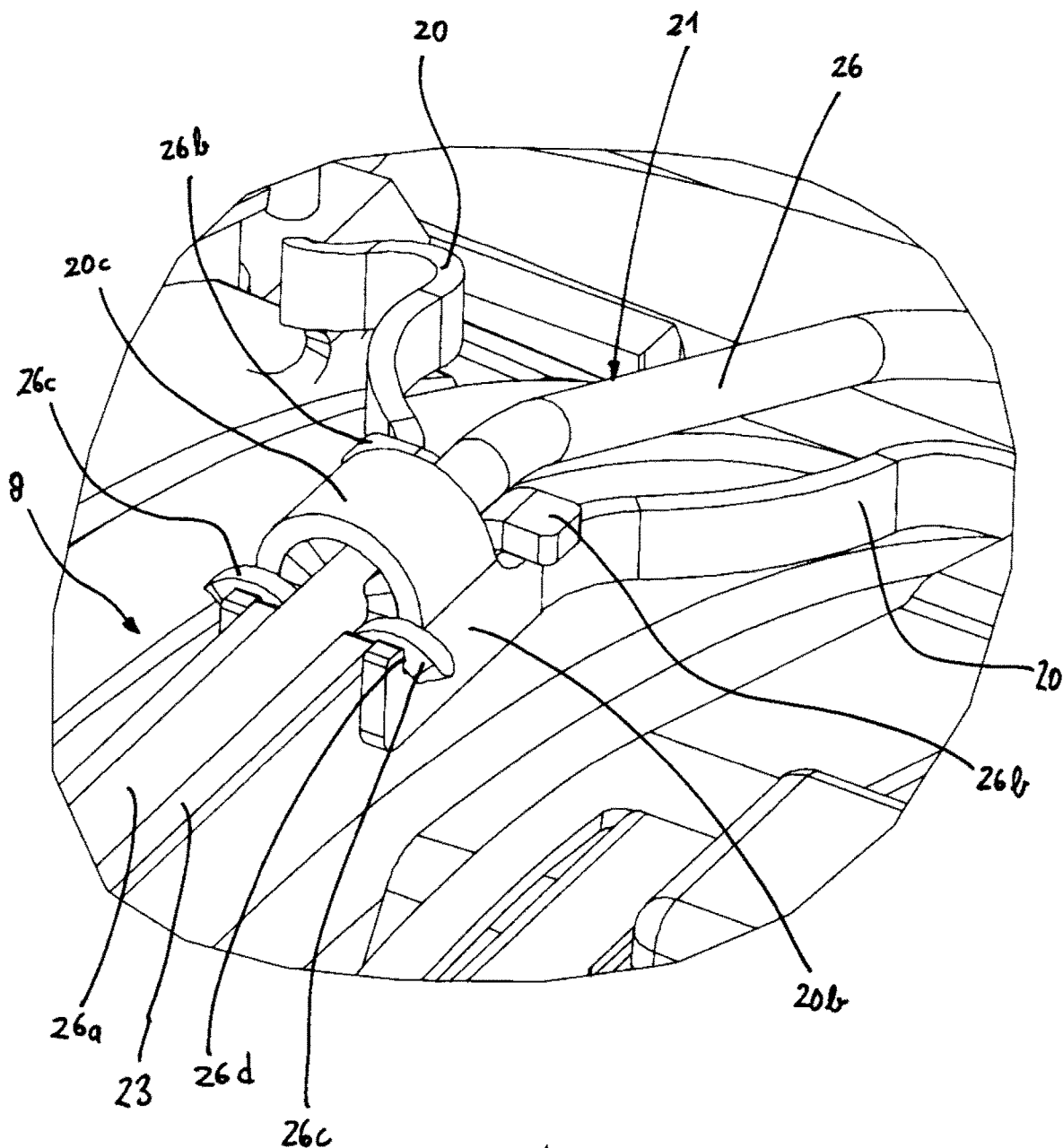
FIGS. 4-6 show schematic detail illustrations of the first function group as per FIGS. 1-3 in various detail views.
Figure 5:
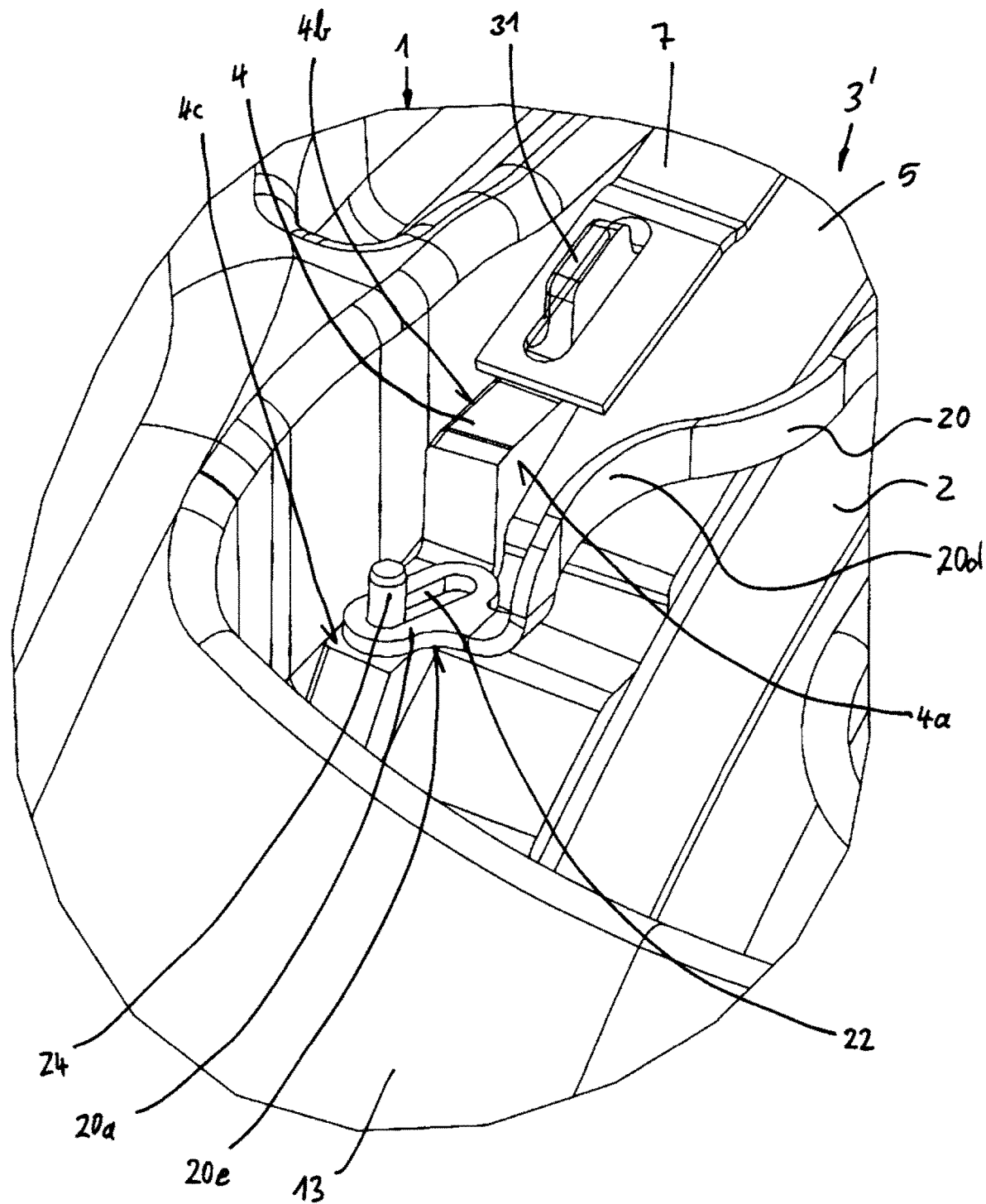
Figure 6:
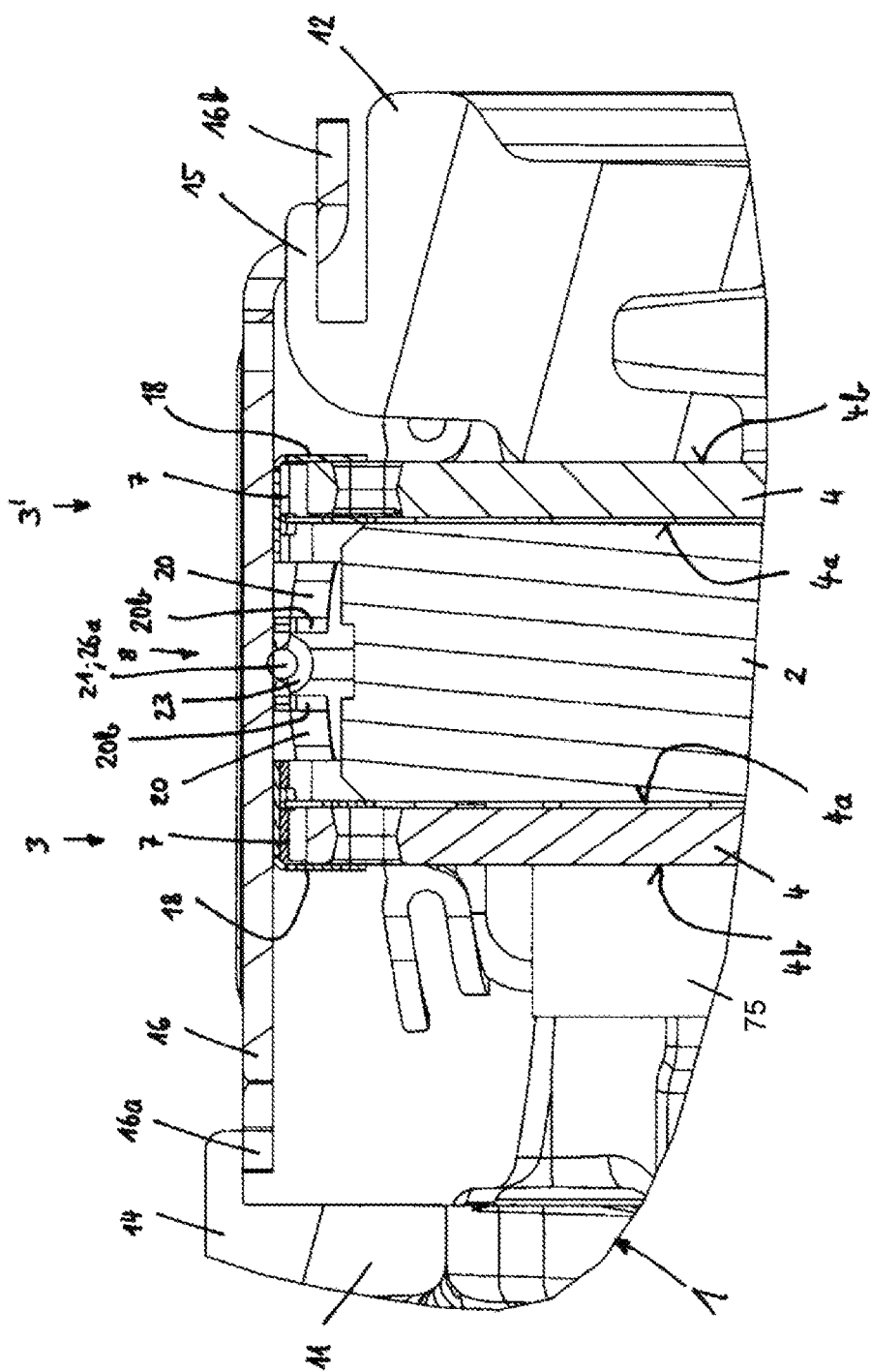

FIG. 3 illustrates a perspective view of a first function group of the resetting device of the exemplary embodiment of the disc brake as per FIG. 1. FIGS. 4-6 show schematic detail illustrations of the first function group as per FIGS. 1-3 in various detail views.

Here, the resetting device is composed of two function groups. The first function group comprises at least one spreading device 8, wherein the second function group has at least one resetting element. Here, the two function groups are provided jointly and assist one another. It is however also possible for only one of the two function groups to be used.

The first function group engages with the spreading device 8 in the upper region of the pad carrier plates 4 of the mutually oppositely situated brake pads 3, 3', so as to act equally counter to the application direction. The second function group exerts in each case thrust and/or pulling forces on the brake pads 3, 3', likewise counter to the application direction, by means of the resetting element(s) in the middle and/or lower region of the pad carrier plates 4 of the mutually oppositely situated brake pads 3, 3'. In this way, the brake pads 3, 3' are acted on by the resetting device with resetting forces simultaneously both in their upper regions and in their middle and/or lower regions.

The spreading device 8 comprises a retaining bow 21 and two spreading elements, which are two identical pairs of spring arms 20. The retaining bow 21 is positionally static and forms a retainer for the pairs of spring arms 20.

Here, the retaining bow 21 is formed as a C-shaped wire and is designed for example with a circular cross section.

The retaining bow 21 comprises a central section 26a in a central region of the opening 9. The central section 26a is arranged centrally in relation to the thickness of the brake disc 2. The central section 26a is adjoined on each side by a center limb 26 which, like the central section 26a, runs in each case in an arc in a circumferential direction of the brake disc 2, coaxially with respect to the latter. Accordingly, proceeding from the center of the opening 9, the retaining bow 21 extends to both sides in each case as far as a brake carrier horn 25 of the pad slot of the application-side brake pad 3.

To each end of the center limb 26 there is attached an end limb 27 which is bent through 90° relative to the center limb 26 and which runs toward the respective brake carrier horn 25. Each end limb 27 then runs parallel to the brake disc axis 2a and is then bent downward through approximately 90° into in each case one fastening section 27a. Each fastening section 27a is fastened in a bore 25a of each brake carrier horn 25 and thus realizes the retention of the retaining bow 21 with the spreading device 8 in the brake carrier 6.

Here, the retaining bow 21 thus forms a centering device for the brake caliper 1, as the brake carrier 6, to which the retaining bow 21 is fastened, forms a positionally static part which is mounted so as to be displaceable relative to the brake caliper 1, such that, after a release of the brake and a spreading movement of the spreading device 8, that is to say after the brake pads 3 have been pushed apart, the brake caliper 1 is guided into a centered position.

The two spring arms 20 of each pair of spring arms 20 are formed mirror-symmetrically with respect to the central section 26 of the retaining bow 21.

The pairs of spring arms 20 are arranged opposite one another in a transverse direction of the opening 9 such that they are fastened by way of inner ends, which point toward the center of the opening 9, to the retaining bow 21, wherein their outer free ends interact with the pad carrier plate 4 of the brake pads 3, 3'. Here, one pair of spring arms 20 is arranged to the right of the central point of the opening 9, wherein the other pair of spring arms 20 is arranged to the left of the central point of the opening 9.

FIG. 4 shows an enlarged illustration of the attachment of the inner ends of a pair of spring arms 20 to the retaining bow 21. FIG. 5 shows an enlarged illustration of a thrust section 22a of a free outer end of a spring arm 20 in interaction with an associated pad carrier plate 4. FIG. 6 illustrates a schematic detailed view of the disc brake 10 in a vertical plane of the brake disc axis of rotation 2a.

The description of one spring arm 20 of the two spring arms 20 of the pair of spring arms 20 applies mirror-symmetrically to the other spring arm 20 of the pair, as clearly emerges from FIGS. 3 and 4.

Each spring arm 20 has a multiple bent body with an inner end and an outer end. The inner ends of the two spring arms 20 of a pair of spring arms 20 are formed as connecting sections 20b which run parallel to one another and which are connected by way of a common hood-type connector 20c, by means of which a fastening of the pair of spring arms 20 to the retaining bow 21 is formed. Here, the intermediate section 26a of the retaining bow 21 runs, in the installed state of the spreading device 8, between the two parallel-running connecting sections 20b. The outer free end of each spring arm 20 has an end section 20d with, attached thereto, a thrust section 20a with an elongated hole 22 for interacting with the pad carrier plate 4, as will be discussed in more detail below.

The hood-type connectors 20c are connected on both sides in each case to the connecting section 20b, which forms in each case an extension of each spring arm 20, and said hood-type connectors are bent into a sleeve-shaped form around the central section 26a of the retaining bow 21. In this way, each hood-type connector 20c together with the two spring arms 20 of said pair of spring arms 20 is mounted rotatably on the central section 26a of the retaining bow 21.

Each hood-type connector 20c has a receiving opening, pointing downwardly toward the brake disc 2, in the longitudinal direction of the central section 26a of the retaining bow 21, which receiving opening communicates with the outer contour of the central section 26a of the retaining bow 21. The spring arms 20, which are connected in pairwise fashion to in each case one hood-type connector 20c, are, by way of their respective hood-type connector 20c, placed onto the central section 26a of the retaining bow 21 from above such that the central section 26a is received in the receiving openings of the hood-type connectors 20c.

The spreading device 8 furthermore has a clamp with a center web, which is referred to here as longitudinal connector 23. The clamp furthermore comprises four bent-over lugs as securing elements 26c, and four hold-down means as widened portions 26b, which are intended to push the spring arms 20 onto the pad carrier plates 4.

The widened portions 26b lie, in each case at both sides at the transition of the central section 26a to the center limb 26 of the retaining bow 21, on the connecting sections 20b of the spring arms 20. In this way, the widened portions 26b prevent a lift-off of the hood-type connectors 20c from the central section 26a. At the same time, the widened portions 26b form an axial stop for the hood-type connectors 20c of the respective pair of spring arms 20 in the direction of the longitudinal axis of the central section 26a, in each case outward from the center of the opening 9 toward the adjacent tension struts 13 (see FIGS. 1, 2 and 4).

The respective two connecting sections 20b of the spring arms 20 point with their free ends toward the center of the opening 9 and are in each case connected in their end regions to the securing element 26c. The securing element 26c is composed of two bent-over lugs which are fixed in each case with one end in a groove 26d in in each case one end region of the connecting sections 20b. In this way, the securing elements 26c serve to further secure a respective hood-type connector 20c against release from the central section 26a.

The bracing of the spreading elements is ensured by means of the bent-over lugs as securing elements 26c of the clamp, which are bent over during the installation process and engage into the groove 26d. The spreading element is thus secured such that it does not slip in the direction of the center and tilt toward the pad carrier plate 4.

By virtue of the fact that the center web (longitudinal connector 23) of the clamp is furthermore of continuous form, the clamp can also no longer slip axially on the retaining bow 21. It is thus possible to dispense with weld seams or further fixing means. The clamp additionally also serves as a spacer.

The spreading device is thus particularly flexible and adaptable.

The body of each spring arm 20 has multiple bends. Here, proceeding from that end of the connecting section 20b which points towards the associated tension strut 13 of the brake caliper 1, the body runs initially away from the retaining bow 21 in an S-shaped arc, such that the tension-strut-side end of the S-shaped arc is situated with a spacing to the retaining bow 21 which amounts to for example 2.5 times a spacing of the connecting section 20b to the retaining bow. Said end of the S-shaped arc transitions into a further S-shaped arc. The free end of the further S-shaped arc is the end section 20d, and is now spaced apart from the retaining bow 21 by for example 2.5 times the spacing of the end of the first S-shaped arc to the retaining bow 21.

The thrust section 20a is attached to the end section 20d via a connecting section which runs downwardly in an arc. Here, the thrust section 20a lies in a tangential plane relative to the brake disc 2.

The thrust sections 20a are formed, in their respective longitudinal direction, with the elongated hole 22 which serves as a guide section for the spring arms 20 of the spreading device 8. The central longitudinal axes of the elongated holes 22 however run at an angle relative to a longitudinal axis of the associated pad carrier plate 4, which angle lies in a range of for example greater than 0° and less than 45°. Here, the central longitudinal axes of the elongated holes 22 of the thrust sections 20a intersect a common pad carrier plate 4 at an imaginary intersection point, which lies on that side of the pad carrier plate 4 on which the friction pad 5 is arranged.

In the assembled state of the disc brake 10, the thrust sections 20a interact, by way of their elongated holes 22, in each case with a pin 24, as can be clearly seen in FIG. 5. A pin 24 is fixedly connected to the pad carrier plate 4, for example inserted into a bore, at each end of the pad carrier plate 4. Here, an end, protruding from the pad carrier plate 4, of the pin 24 extends through the associated elongated hole 22 of the respective thrust section 20a of a spring arm 20 of the spreading device 8. Central axes of the pins 24 run parallel to one another and perpendicular to the brake disc axis of rotation 2a. The elongated holes 22 permit relative movements between the spring arms 20 of the spreading device 8 and the brake pads 3, which move in the direction of the brake disc axis of rotation 2a. The spring forces of the spring arms 20 make it possible for the brake pads 3 to be released from the brake disc 2 and reset after a braking operation, as already described above.

Here, the fastening sections 20a lie in each case with bearing surfaces 20e on a bearing surface 4c of the respective pad carrier plate 4. The bearing surfaces 4c of the pad carrier plate 4 run tangentially with respect to the brake disc 2 and, in the case of each brake pad 3, lie in a plane.

The spring arms 20, the thrust sections 20a thereof and the connecting sections 20b thereof with the hood-type connectors 20c are formed for example in one piece as punched and bent parts composed of spring steel strip. The spreading elements, that is to say the spring arms 20, may thus for example be formed from inexpensive and geometrically flexible metal sheets.

Figure 7:
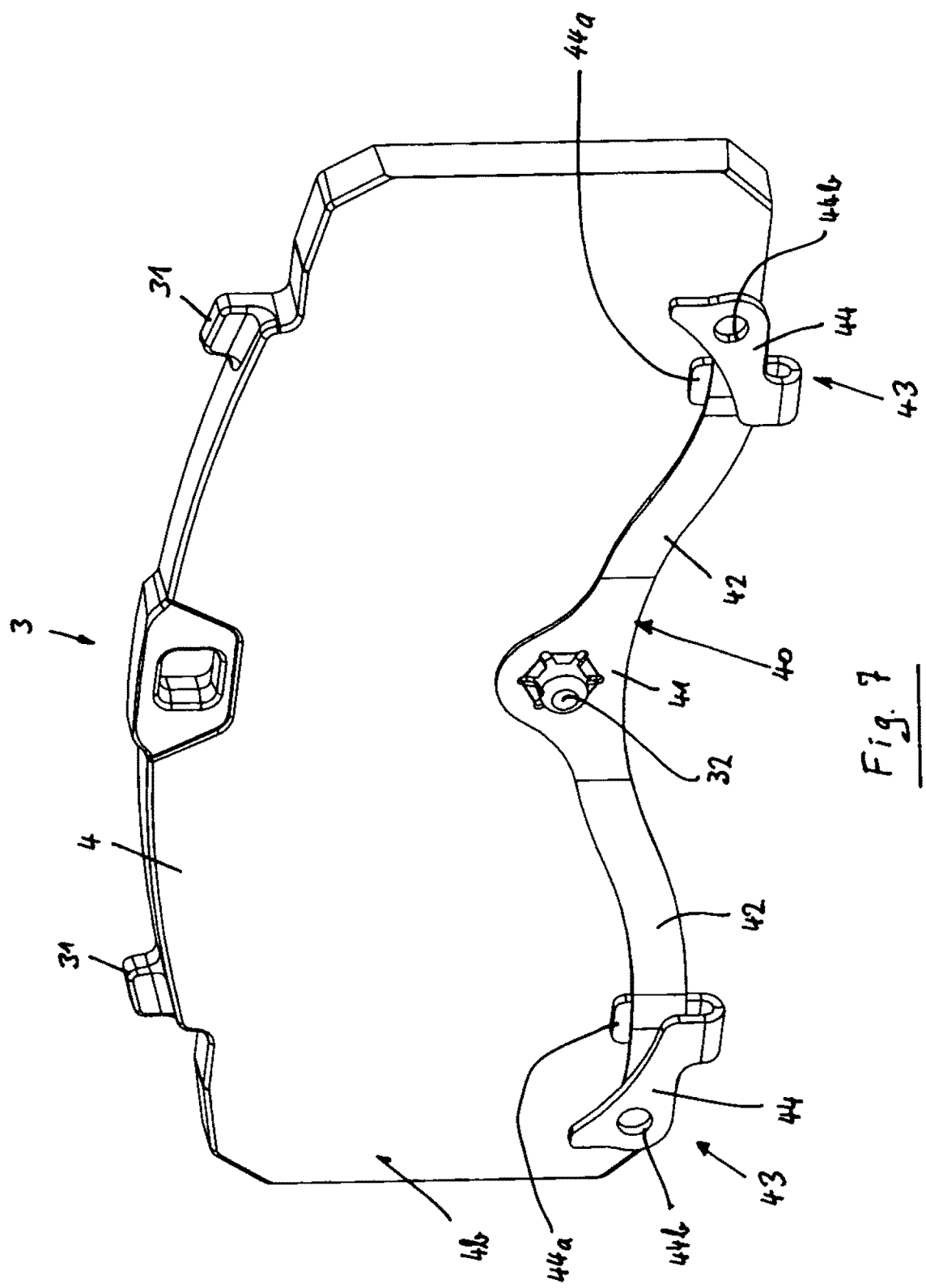
FIGS. 7-8 show perspective views of a second function group of the resetting device of the exemplary embodiment of the disc brake as per FIG. 1.
Figure 8:
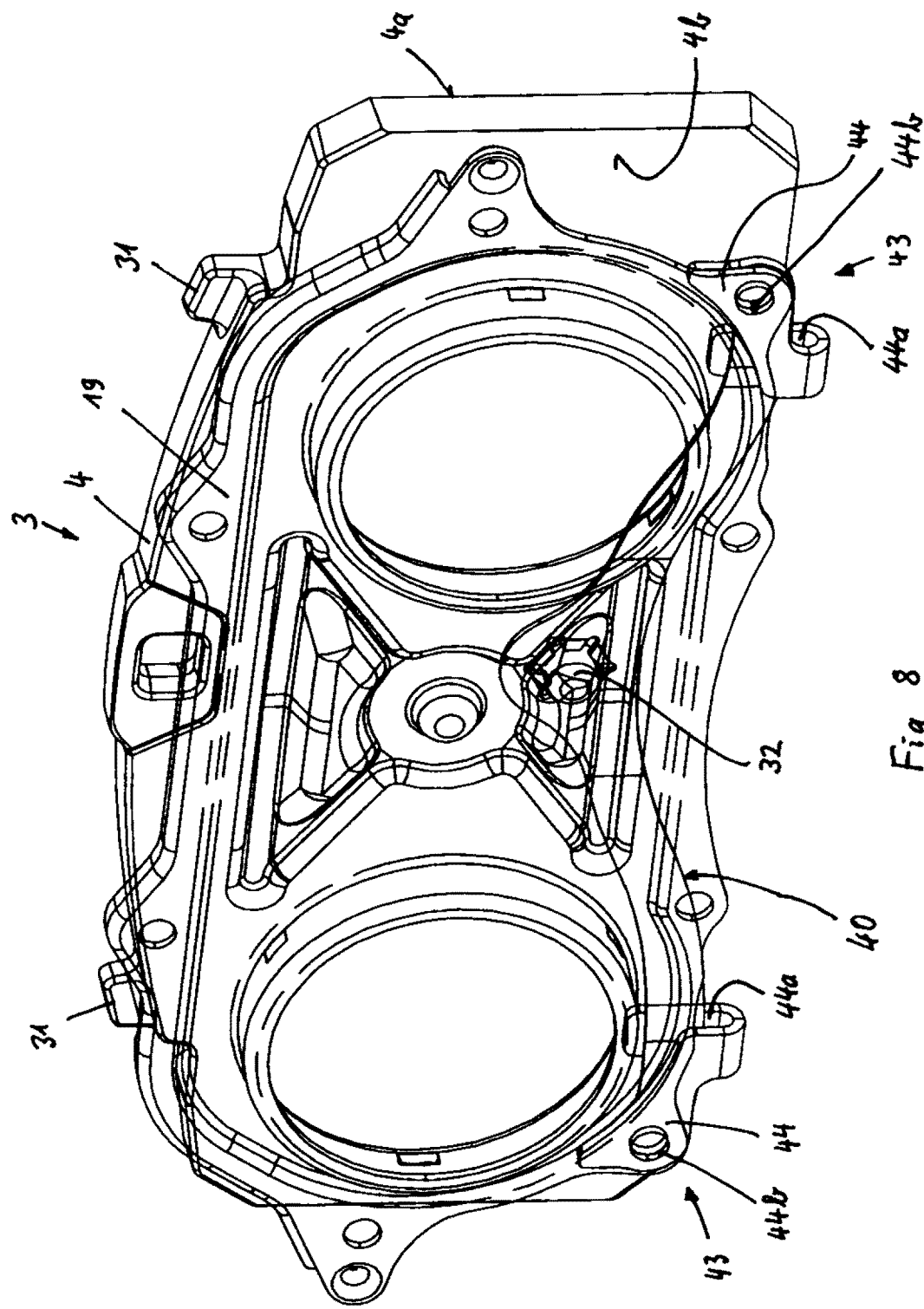

FIGS. 7 to 8 illustrate perspective views of a second function group of the resetting device of the exemplary embodiment of the disc brake as per FIG. 1.

FIG. 7 shows a perspective view of a thrust side 4b of the pad carrier plate 4 of the application-side or inner brake pad 3 with a resetting element 40.

The thrust side 4b of the pad carrier plate 4 is that side of the pad carrier plate 4 which does not bear a friction pad 5, and which is in contact either with the application device or with the caliper rear section 12.

The resetting element 40 provides assistance of the resetting movement of the application-side brake pad 3 from the brake disc 2 after a braking process. Here, the resetting element 40 engages with a section in a lower region on the respective pad carrier plate 4 in addition to the engagement point(s) at the top side of the spring arms 20, wherein the resetting element 40 is connected with a different section to a section positionally static relative to the resetting element 40, for example brake caliper 1 and/or brake carrier 6.

For this purpose, the resetting element 40 in the embodiment as per FIG. 7 is fastened, with a section in a lower region of the pad carrier plate 4 on the thrust side 4b thereof, to a retaining peg 32. The retaining peg 32 may self-evidently also be designed in some other form, for example a screw, bolt or the like. Furthermore, the resetting element 40 is attached with a further section in a lower region of the base plate 19 (see also FIG. 1) of the application section 11 of the brake caliper 1.

In this regard, FIG. 8 shows a schematic perspective illustration of base plate 19 and transparent pad carrier plate 4 with engagement of the resetting element 40.

Here, the resetting element 40 is a spring element with a central section 41, two spring arms 42 and two fastening sections 43 with in each case one U-shaped lug 44 with a limb 44a. The central section 41 and the spring arms 42 are produced for example from a flat spring steel strip, wherein the fastening sections 43 may be conventional sheet steel.

The central section 41 is connected centrally to the retaining peg 32 by means of a clamping/claw-type connection. At each side, the central section 41 transitions symmetrically into the respective spring arm 42. Each spring arm 42 extends to the left and to the right from the central section 41 in a lower region along the pad carrier plate 4, and is shaped correspondingly to the contour thereof. The ends of each spring arm 42 are connected in each case to the fastening section 43. Each fastening section 43 is shaped such that the bends of the U shapes of the lug 44 and the limbs 44a are aligned with one another and lie in a tangential direction with respect to the brake disc axis of rotation 2a. That limb of the fastening sections 43 which points in each case toward the base plate 19 runs outward as a lug 44 and widens so as to have in each case one fastening bore 44b for the fixing, by means of screws of the base plate 19, to said base plate. The screws may also be existing fastening screws of the base plate 19.

After a braking process, the brake pads 3, 3' are firstly pushed apart from one another, and thus reset away from the brake disc 2, again by the spring arms 20 of the spreading device 8. At the same time, the resetting element 40, which may also be installed in already prestressed fashion, is stressed during the braking process owing to its positionally static fixing of its fastening sections 43 to the base plate 19, and can, after the braking process, additionally retract the brake pad 3 from the brake disc 2 by application of a pulling force thus stored.

FIGS. 9-17 show perspective views of variants of the second function group of the resetting device.

Figure 9:
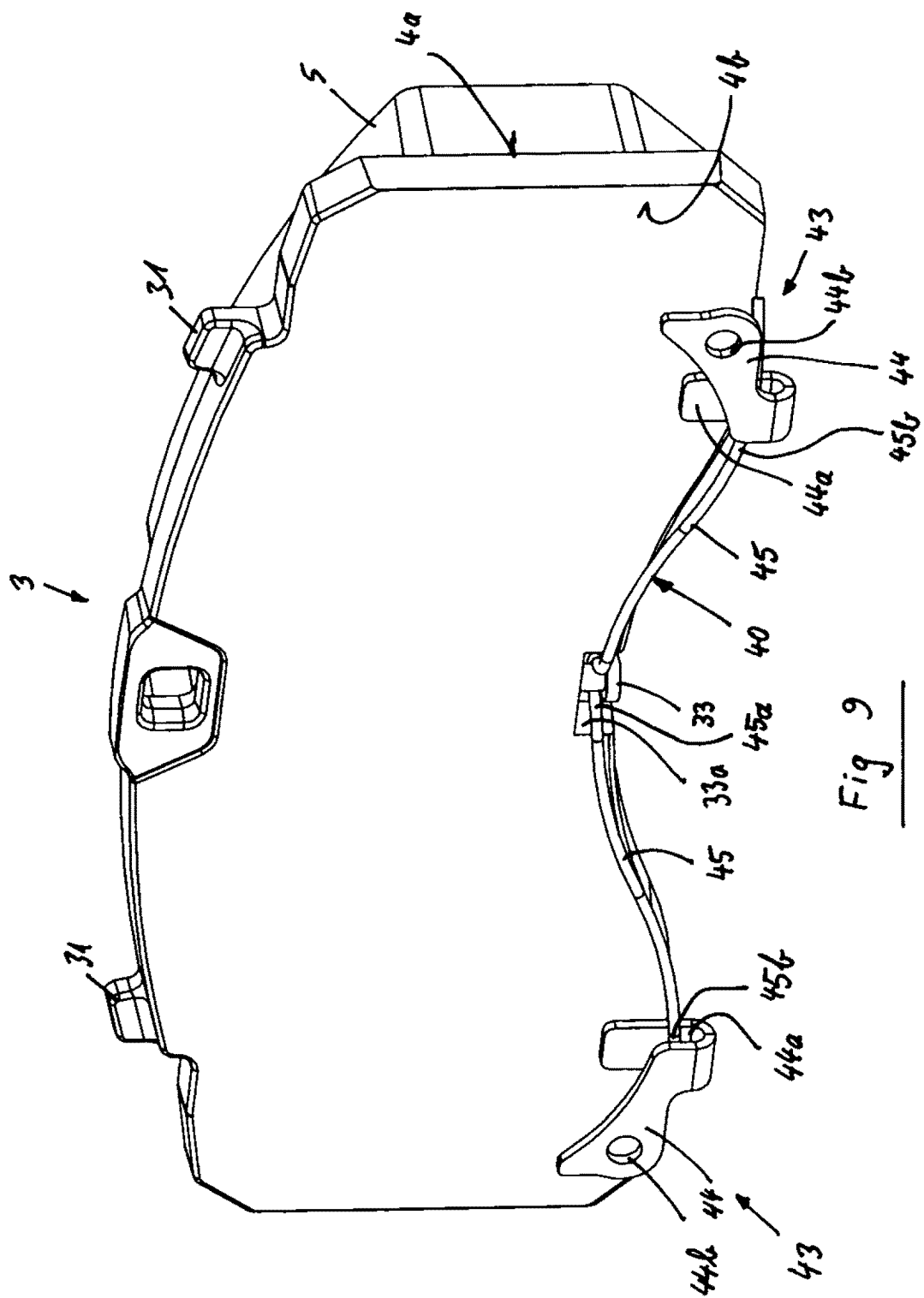
FIGS. 9-17 show perspective views of variants of the second function group of the resetting device.

FIG. 9 shows a first variant of the second function group of the resetting device as per FIG. 8. The fastening sections 43 are identical to those of the embodiment as per FIG. 8. By contrast thereto, the resetting element 40 of said first variant is formed from a spring wire. The spring wire has two spring arms 45 which are connected by way of a central section 45a. The free ends of the spring arms are fixedly connected as end sections 45b to the respective fastening section 43, for example by welding. The central section 45a is in this case a constituent part of the spring wire and is fastened to a retainer 33 on the bottom side of the pad carrier plate 4.

The retainer 33 is in this case formed as a bolt with a head plate, the diameter of which is larger than the bolt body. The retainer 33 is arranged in a recess 33a of the pad carrier plate 4 in the bottom side thereof. Here, the central section 45a is looped around the region of the bolt between the base of the recess 33a and the head plate of the bolt within the recess 33a.

The function of the resetting element 40 is as described in conjunction with the embodiment as per FIGS. 7-8.

Figure 10:
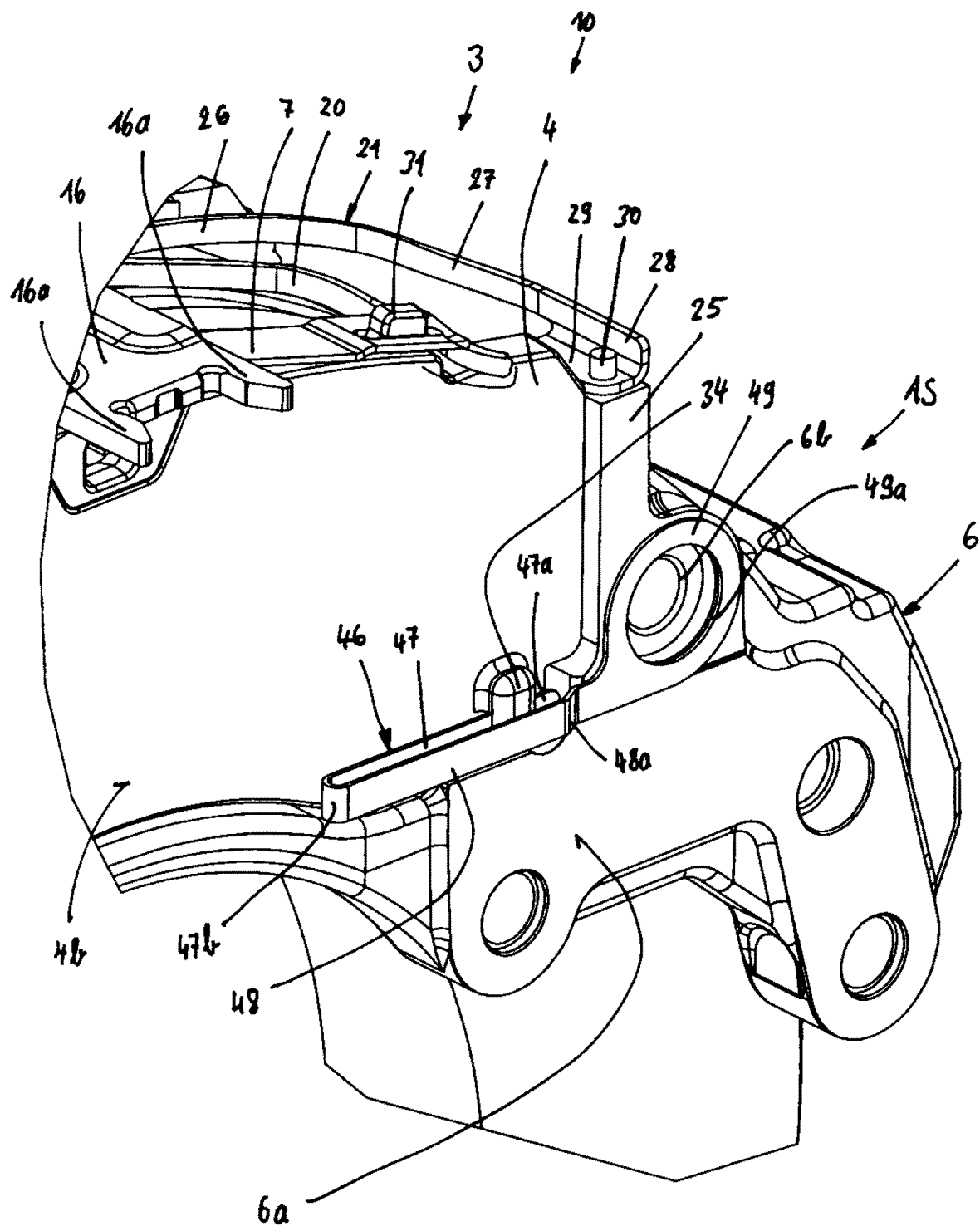

FIG. 10 illustrates a second variant of the second function group and furthermore shows the right-hand half of the installed application-side brake pad 3 in its associated pad slot with the brake carrier 6. The brake pad 3 is pushed into the pad slot by the pad retaining stirrup 16, the application-side retaining end 16a of which is visible, via the pad retaining spring 7, which is retained on the projections 31. Here, the brake carrier 6 is illustrated with its fastening side 6a, in which multiple fastening holes (not designated) for the fastening to a positionally static part of an associated vehicle are formed. The right-hand, in this case (see FIG. 1) the run-out side, brake carrier horn 25 with a bearing receptacle 6b arranged therebelow is also shown. The bearing receptacle 6b receives a bearing beam of the longitudinal bearing of the brake caliper 1.

In the second variant, the second function group comprises two resetting elements 46, of which FIG. 10 shows only the right-hand resetting element at the right-hand bottom side of the pad carrier plate 4. The secondary setting element 46 of this second variant is arranged, and correspondingly constructed, at the left-hand bottom side (not shown here, but easily imaginable) of the pad carrier plate 4, mirror-symmetrically with respect to the right-hand resetting element 46.

The resetting element 46 comprises a first spring arm 47 with a clamping end 47a and with a connection, comprises a second spring arm 48 with a connection 48a, and comprises a fastening section 49 with an opening 49a.

The first spring arm 47 is plugged with its clamping end 47a into a retainer 34 and is fastened to the latter, for example by means of a clipping action/indentation action or the like. Here, the retainer 34 protrudes on the right-hand lower corner of the thrust side 4b of the pad carrier plate 4 and may for example be cast on during the production of the pad carrier plate 4.

The first spring arm 47 extends, in the lower region in front of the thrust side 4b of the pad carrier plate 4, from the retainer 34 toward the left in the direction of the center of the pad carrier plate 4, over a length which corresponds to approximately one third of the length of the pad carrier plate 4. Then, the first spring 47 transitions into the connection 47b, which is bent through approximately 180° outward, that is to say toward the application section 11.

The connection 47a in turn then transitions into the second spring arm 48, which extends oppositely to the first spring arm 47 and parallel to the latter as far as over the retainer 34. The connection 48a is formed as a type of cranked formation in the direction of the pad carrier plate 4, and is connected to the fastening section 49.

The fastening section 49 lies with its large opening 49a in front of the opening of the bearing receptacle 6b of the brake carrier 6 and coaxially with respect thereto. After the fastening of the brake carrier 6, it is thus also the case that the fastening section 49 is fixed in a positionally static manner between the fastening side 6a and the positionally static part of the associated vehicle.

FIG. 10 furthermore shows a variant of the retaining bow 21 in which the end limbs 27 on the sides facing toward one another are equipped, in each case on an end section 28, with a lug 29, on which lugs there are held pegs 30 which engage into bores (not designated) of the brake carrier horns 25. The lug 29 lies on a planar face side of the brake carrier horn 25. The peg 30 may be in the form of a rivet and plugged into the bore of the brake carrier horn 25. It is also possible for the peg 30 to be integrally formed on the brake carrier horn 25, or to have already been fixedly inserted as a separate component.

The two resetting elements 46 may be produced for example as punched and bent parts from a flat spring steel material.

The function of the two resetting elements 46 has already been described above, wherein the positionally static section for the fixing of the resetting elements 46 is in this case the brake carrier 6, and the pulling forces are introduced by the retainers 34 at two corner points of the pad carrier plate 4.

Figure 11:
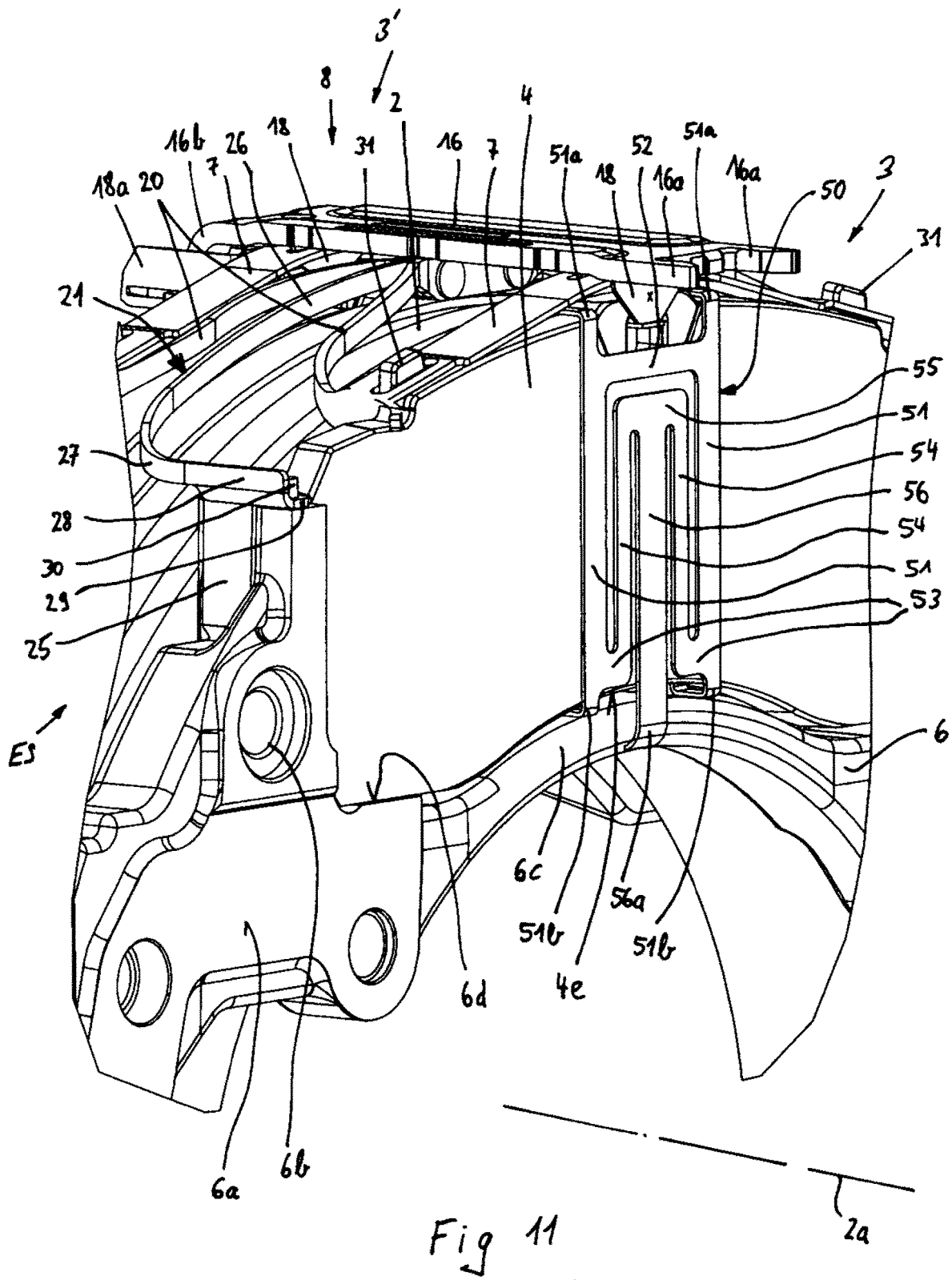

FIG. 11 illustrates a third variant of the second function group with a central resetting element 50.

The resetting element 50 is arranged centrally in a vertical direction on the thrust side 4b of the application-side pad carrier plate 4 and is fastened both to the top side and to the bottom side of the pad carrier plate 4, wherein a positionally static fixing of one end of the central resetting element 50 is formed centrally on an application-side bridge connector 6c of the brake carrier 6.

The central resetting element 50 has two lateral longitudinal members 51 which are arranged parallel to one another and the upper ends of which, as gripping sections 51a, engage fixedly as clips around the top side of the pad carrier plate 4 on the left and on the right adjacent to the clip element 18. In the same way, the two longitudinal members 51 are, at their bottom ends, equipped with gripping sections 51b of said type, which engage fixedly as clips around the bottom side of the pad carrier plate 4.

The two longitudinal members 51 are connected, below the upper gripping sections 51a, by means of a transverse connector 52. At the bottom side, the longitudinal members 51 are, above the lower gripping sections 51b, connected to in each case one transverse connector 53, to which in each case one further longitudinal member 54 is attached. The further longitudinal members 54 extend upward in each case parallel to the outer longitudinal members 51 and are connected at their upper ends, below the transverse connector 53, to a further transverse connector 55.

In the center of the further transverse connector 55 there is attached a central longitudinal member 56, which extends downward between the two longitudinal members 54 beyond the gripping sections 51b and ends in a dedicated gripping section 56a. Said central gripping section 56a is fixed centrally in a suitable manner, for example by means of a gripping action, to the positionally static bridge connector 6c of the brake carrier 6.

The function is as described above.

FIGS. 12 to 15 show variants of central resetting elements 50 on the thrust side 4b of the application-side pad carrier plate 4 of the application-side brake pad 3 together with the pad retaining stirrup 16.

The fixing of the resetting elements 50 to the pad carrier plate 4 is arranged in each case in the lower region thereof, wherein the positionally static fixing of the resetting elements 50 is provided in each case on the application-side retaining end 16a of the pad retaining stirrup 16. The function of the resetting elements 50 has already been discussed above.

Figure 12:
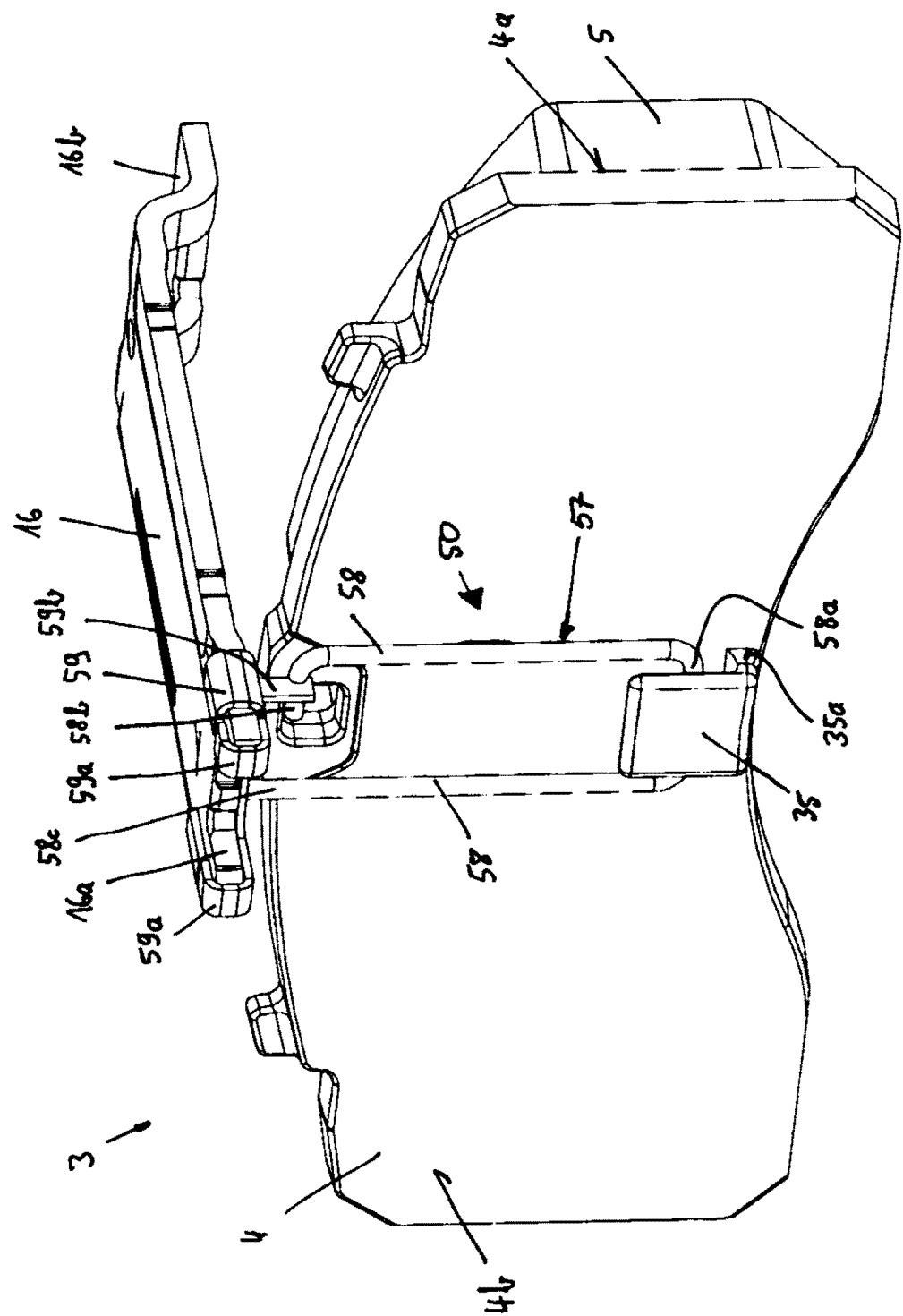

The resetting element 50 as per FIG. 12 has a spring body 57 in wire form with two longitudinal members 58 arranged parallel to one another. The longitudinal members 58 are in this case connected at the bottom by means of a transverse connector 58a, which is held centrally under a retaining angle piece 35 in the lower region of the pad carrier plate 4. The longitudinal members 58 and the transverse connector 58a may be produced in one piece from spring wire as a bent part.

An upper end of one longitudinal member 58, in this case the right-hand longitudinal member, is bent through approximately 90° toward the center as an end section 58b, and is attached, in a retainer section 59b of a retainer 59, to the application-side retaining end 16a of the pad retaining stirrup 16. The upper end of the other (left-hand) longitudinal member 58 is similarly bent through approximately 90° toward the center as an end section 58c and fastened to the retainer 59. This is not shown here but is easily understandable. Here, the bent end sections 58b, 58c are arranged offset with respect to one another in a vertical direction.

Here, the retainer 59 is formed as a punched and bent part with clip-like retainer sections 59a, which engage around sections of the retaining end 16a of the pad retaining stirrup 16.

The retaining angle piece 35 is, at its bottom side, fastened by means of a limb 35a to the thrust side 4b of the pad carrier plate 4, and extends in this case upward approximately over one quarter of the vertical length of the pad carrier plate 4. Here, the transverse connector 58a is retained approximately centrally between the thrust side 4b of the pad carrier plate 4 and the bottom side of the retaining angle piece 35.

Figure 13:
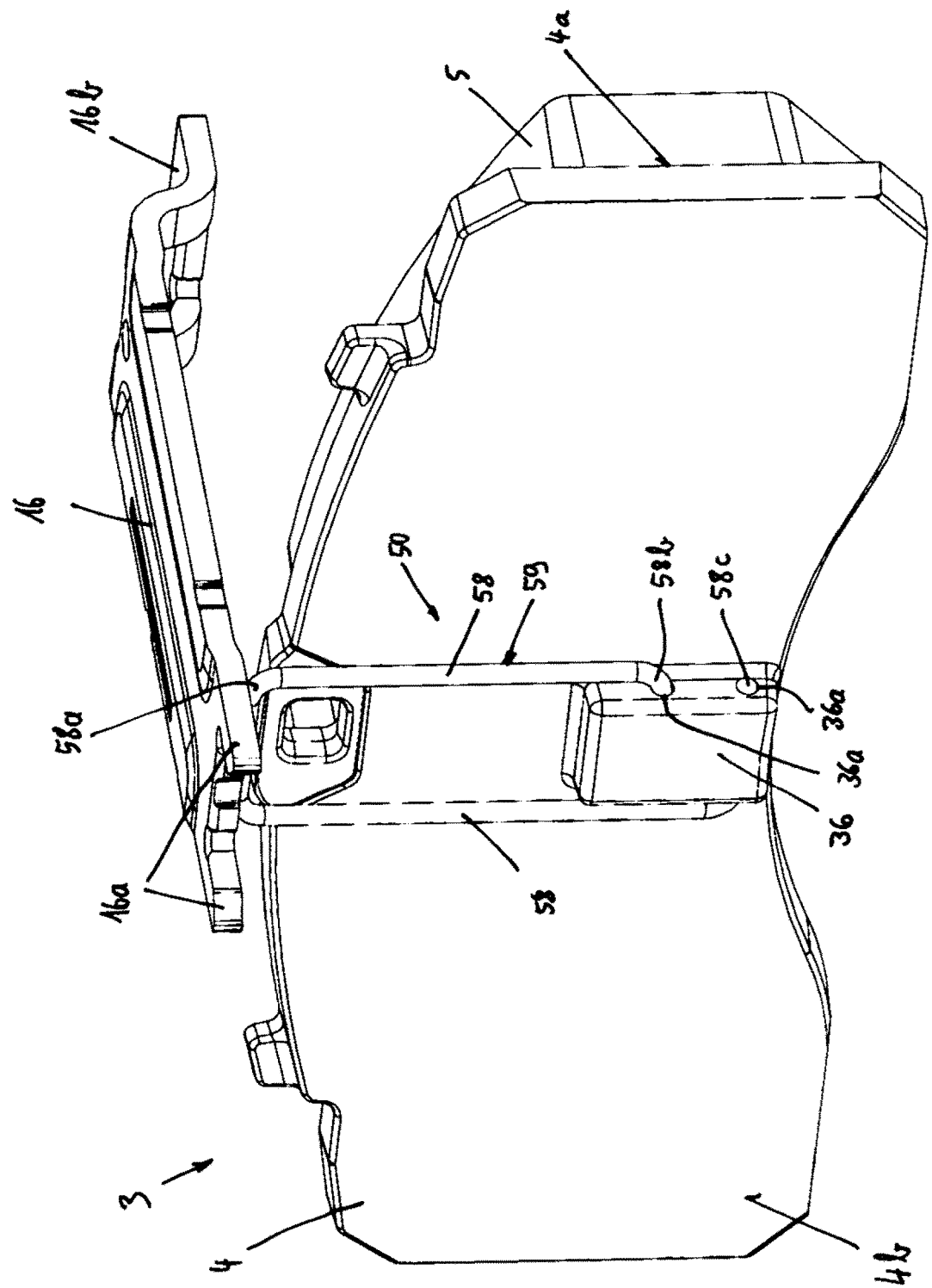

In FIG. 13, the resetting element 50 is designed as in FIG. 12 but is arranged having been rotated through 180°. The transverse connector 58a is attached below the application-side retaining end 16a of the pad retaining stirrup 16. The end sections 58*b* and 58*c* are received, and rotatably fixed, in a block-like retainer 36 in suitable retaining openings 36*a*. The retainer 36 may be cast on during the production of the pad carrier plate 4.

Figure 14:
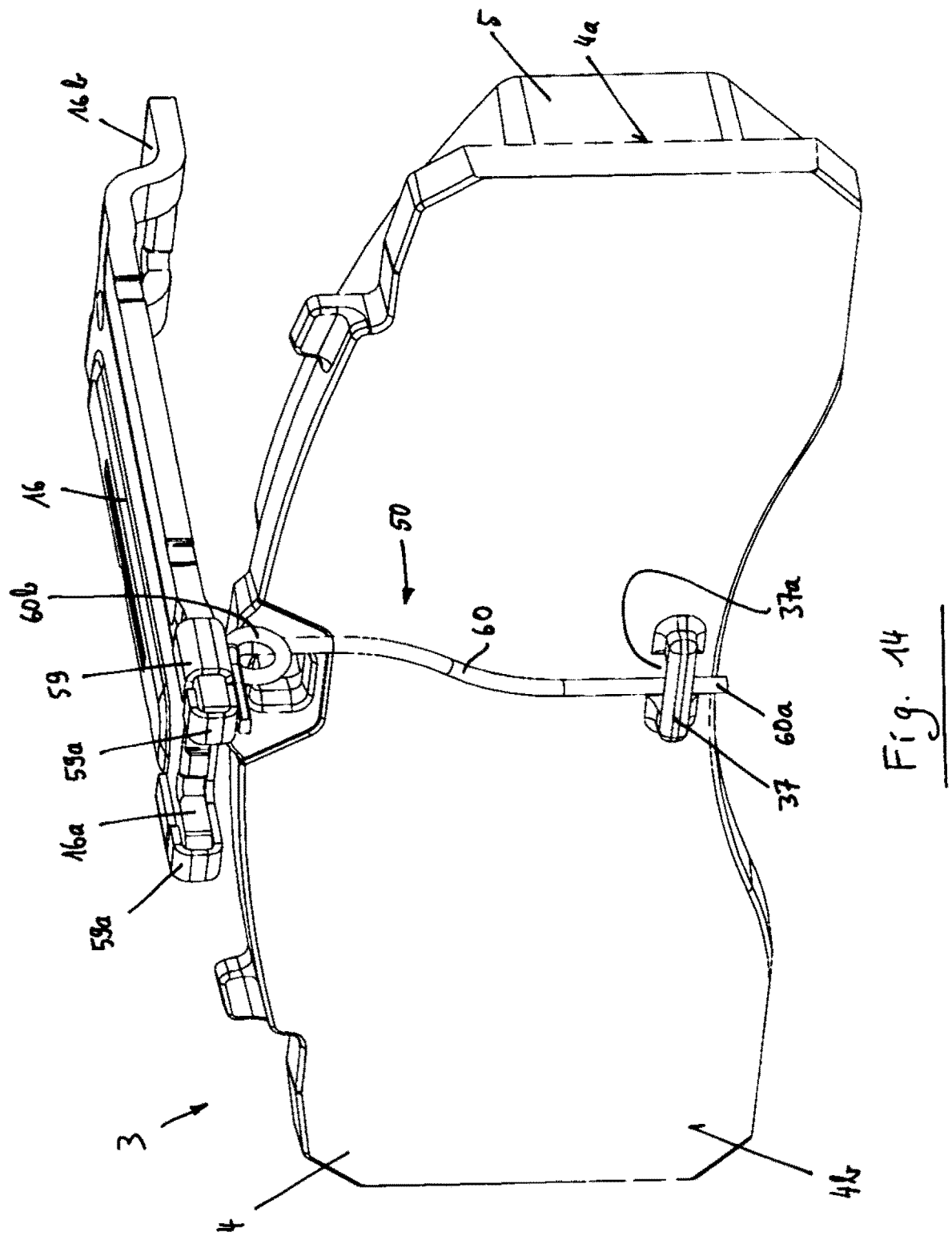

FIG. 14 shows a further resetting element 50 with a single spring body 60, which is plugged with a lower end section 60*a* into a retaining opening 37*a* in a retaining stirrup 37. The upper end of the spring body 60 is designed, in a spring winding, as a fastening section 60*b*, and is attached to a retainer 59 similar to that described in conjunction with FIG. 12, wherein the attachment may be different; for example, the fastening section 60*b* is plugged in or is welded to the retainer 59. Here, the spring body 60 is equipped with two bends with relatively large radii. The retaining stirrup 37 may be cast onto the thrust side 4*b* of the pad carrier plate 4.

Figure 15:
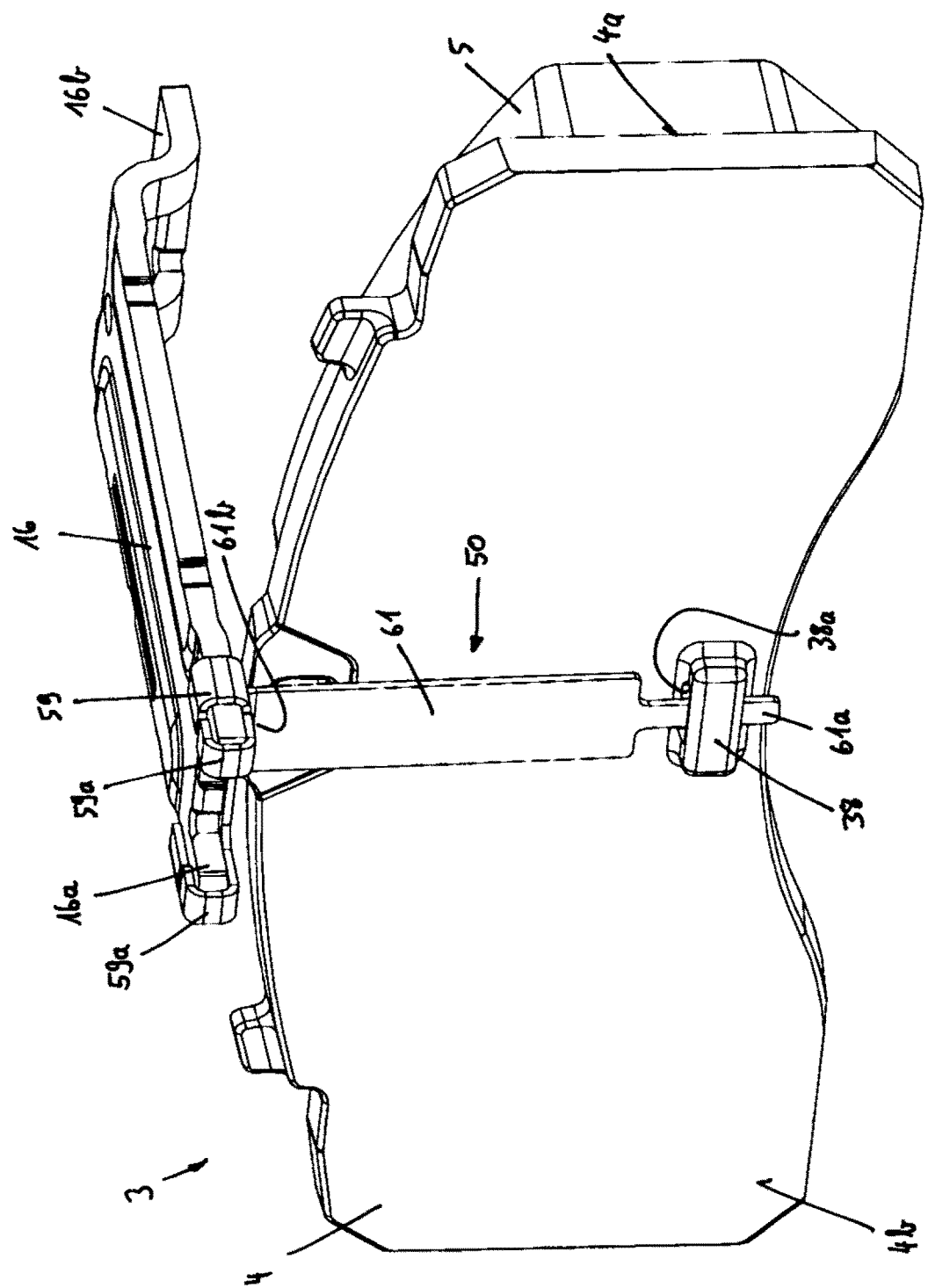

A further variant is shown in FIG. 15, wherein the resetting element 50 is designed as a spring plate 61. Here, a width of the spring plate 61 corresponds for example to twice a thickness of the pad carrier plate 4 in the direction of the brake disc axis of rotation 2*a*. The spring plate 61 is, by means of an end section 61*a*, in engagement with a retaining stirrup 38 in the retaining opening thereof, as has already been described above. A fastening section 61*b* of the spring plate 61 is attached to the retainer 59, already described above, on the application-side retaining end 16*a* of the pad retaining stirrup 16, for example by being plugged in, hooked in, welded on or the like.

The above examples of the second function group of the spreading device 8 related in each case to the application-side brake pad 3. They may self-evidently also be provided on the rear-side brake pad 3'.

Figure 16:
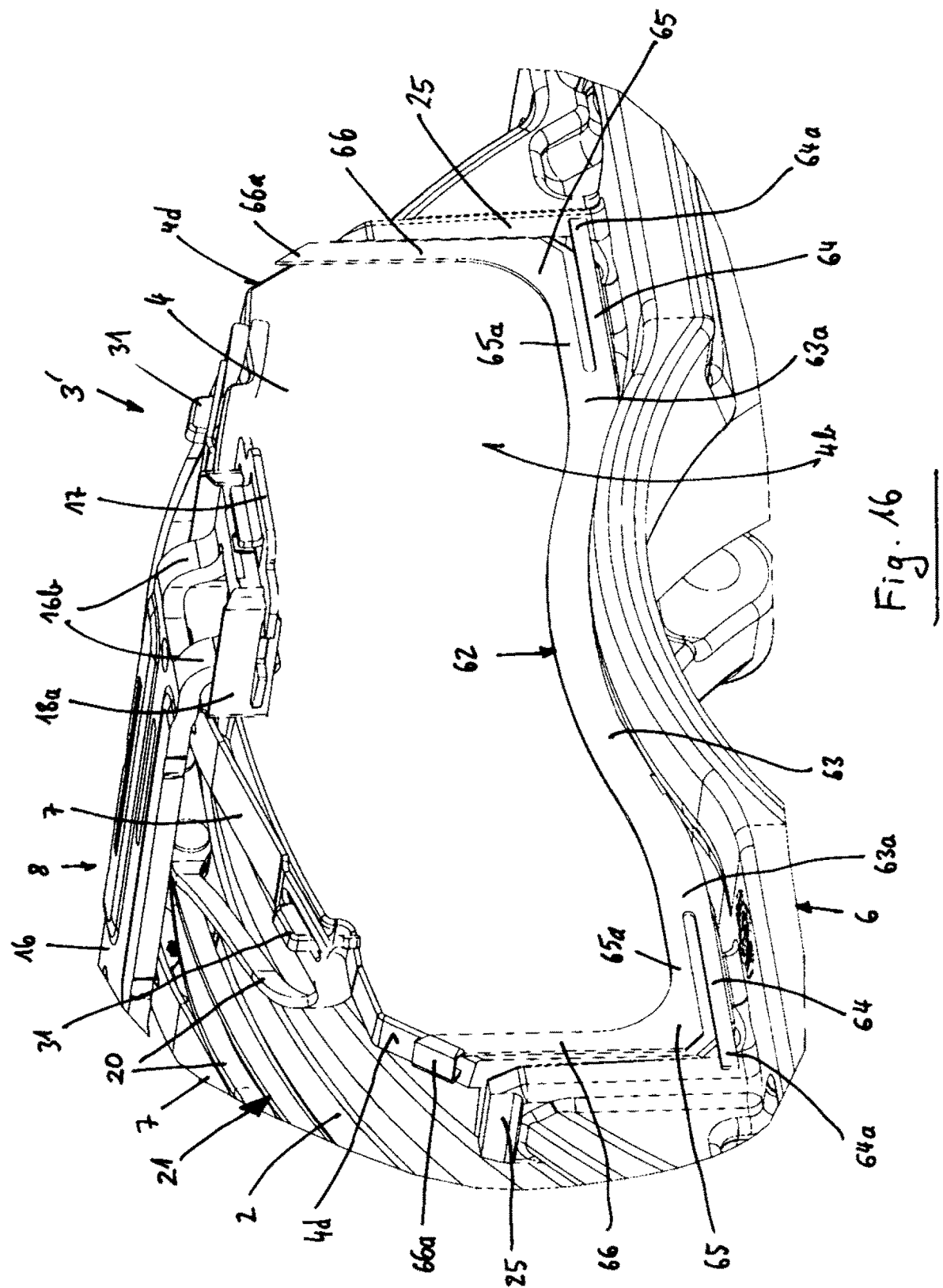
Figure 17:
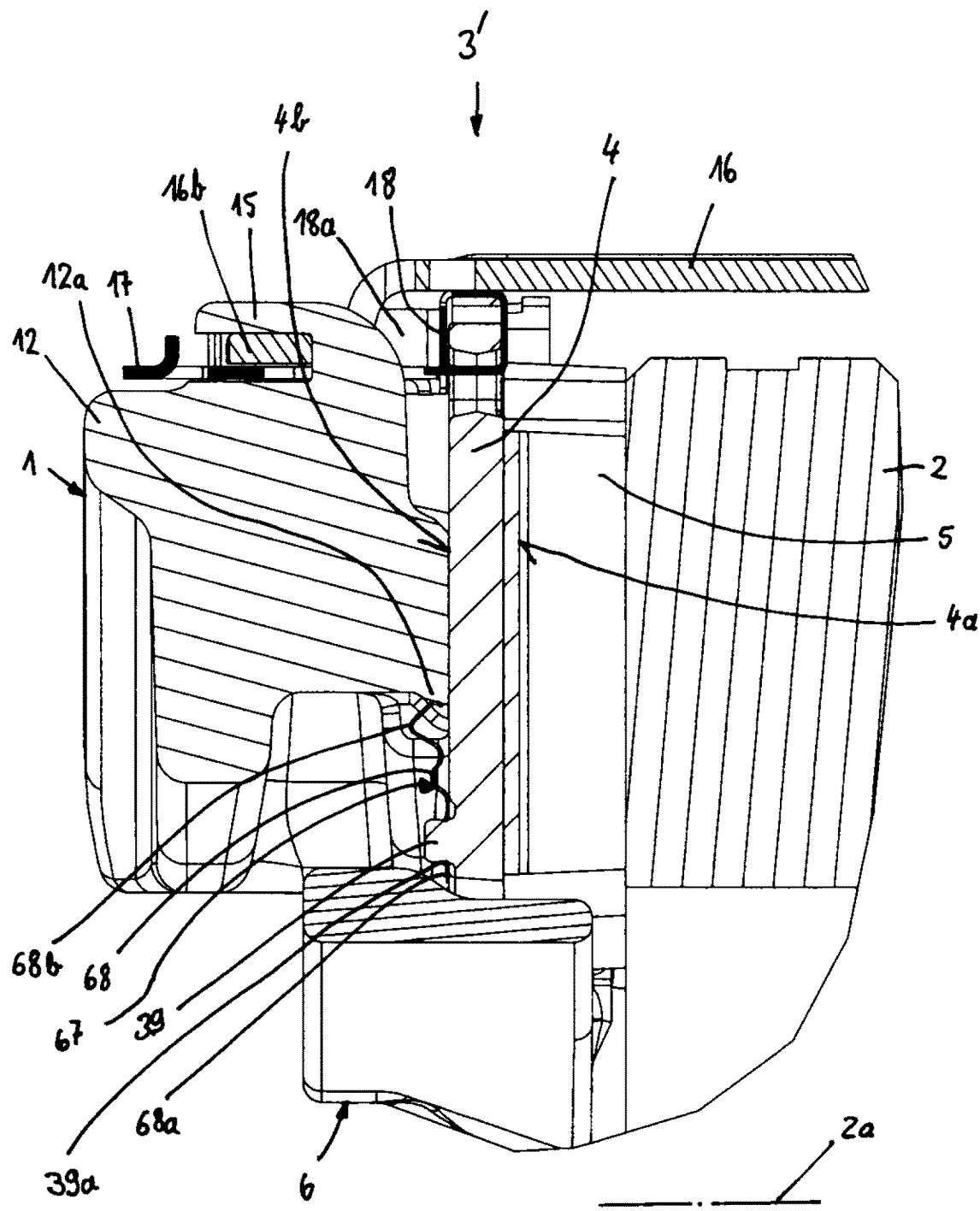

FIGS. 16 and 17 illustrate examples of variants of resetting elements for the rear-side brake pad 3'.

FIG. 16 shows a schematic perspective view of the thrust side 4*b* of the pad carrier plate 4 of the rear-side brake pad 3' in its associated pad slot in the brake carrier 6 between the brake carrier horns 25. Furthermore, the pad retaining stirrup 16 is illustrated with its rear-side retaining end 16*b*, wherein the retaining end 16*b* is equipped with the clip 18*a* and the securing element 17 (not discussed in any more detail).

The resetting element 62 comprises a central section 63 with two connecting sections 63*a*, two spring arms 64 with in each case one spring end 64*a*, two further connecting sections 65, and two further spring arms 66 with in each case one clip end 66*a*.

The central section 63 is arranged in a lower edge region of the thrust side 4*b* of the pad carrier plate 4 and, like said region, is of substantially curved form. At each end of the rounded portion, the central section 63 has, on both sides, the connecting section 63*a*.

In each case one of the spring arms 64 is attached to each connecting section 63*a* in the lower region. Each spring arm 64 extends in a tangential direction in relation to the brake disc 2 as far as over a side of the respective brake carrier horn 25, wherein the respective spring end 64*a* on a side surface of the respective brake carrier horn 25.

Above each spring arm 64, in each case one of the further connecting sections 65 is connected by means of an arm 65*a* to the respective connecting section 63*a*. The arms 65*a* extend, in each case parallel to the spring arms 64, on the thrust side 4*b* from the associated connecting section 63*a* as far as the respective side edge of the pad carrier plate 4, and transition into the associated connecting section 65.

The connecting sections 65 are adapted to the external shape of the corner regions of the pad carrier plate 4, are widened and rounded diagonally toward the center of the pad carrier plate 4, and transition in each case upwardly into the spring arm 66.

Each spring arm 66 extends along a side region of the pad carrier plate 4 on the thrust side 4*b* as far as an oblique upper side section 4*d* of the pad carrier plate 4. Each upper end of the spring arms 66 is equipped with one of the clip sections 66*a*, which are in each case fastened, so as to engage over an oblique side section 4*d*, to the pad carrier plate 4.

It is also possible for the central section 63 to be fastened by means of one or more clip sections (not shown), for example, to the pad carrier plate 4.

In this way, the resetting element 62 is firstly attached by means of the clip sections 66*a* of the spring arms 66 to the pad carrier plate 4 of the rear-side brake pad 3', and is secondly fixed in a positionally static manner by means of the spring arms 64, with the spring ends 64*a* thereof, to the brake carrier horns 25. Said fastening may also already effect a preload of the resetting element 62.

As discussed above, during a braking process, the resetting element 62 is stressed and, by means of the fastening to the pad carrier plate 4, exerts pulling forces on said carrier plate in order to reset the rear-side brake pad 3' away from the brake disc 2 after a braking process.

FIG. 17 shows a sectional view, in a plane running through the brake disc axis of rotation 2*a*, of the disc brake with the rear-side or outer brake pad 3' with a further resetting element 67.

The resetting element 67 is formed as a type of leaf spring with a spring body 68 with in each case one spring end 68*a*, 68*b*. One spring end 68*a* is articulated, in a lower region of the rear-side pad carrier plate 4 on the thrust side 4*b* thereof, on a retaining stirrup 39. The other spring end 68*b*, with a suitable design, digs into a retaining section 12*a* of the caliper rear section 12 of the brake caliper 1. It is possible for the resetting element 67 to be provided centrally, or for two such resetting elements 67 to be provided at the corners, or else for multiple such resetting elements to be provided so as to be distributed over the length of the lower region of the pad carrier plate 4.

Figure 18:
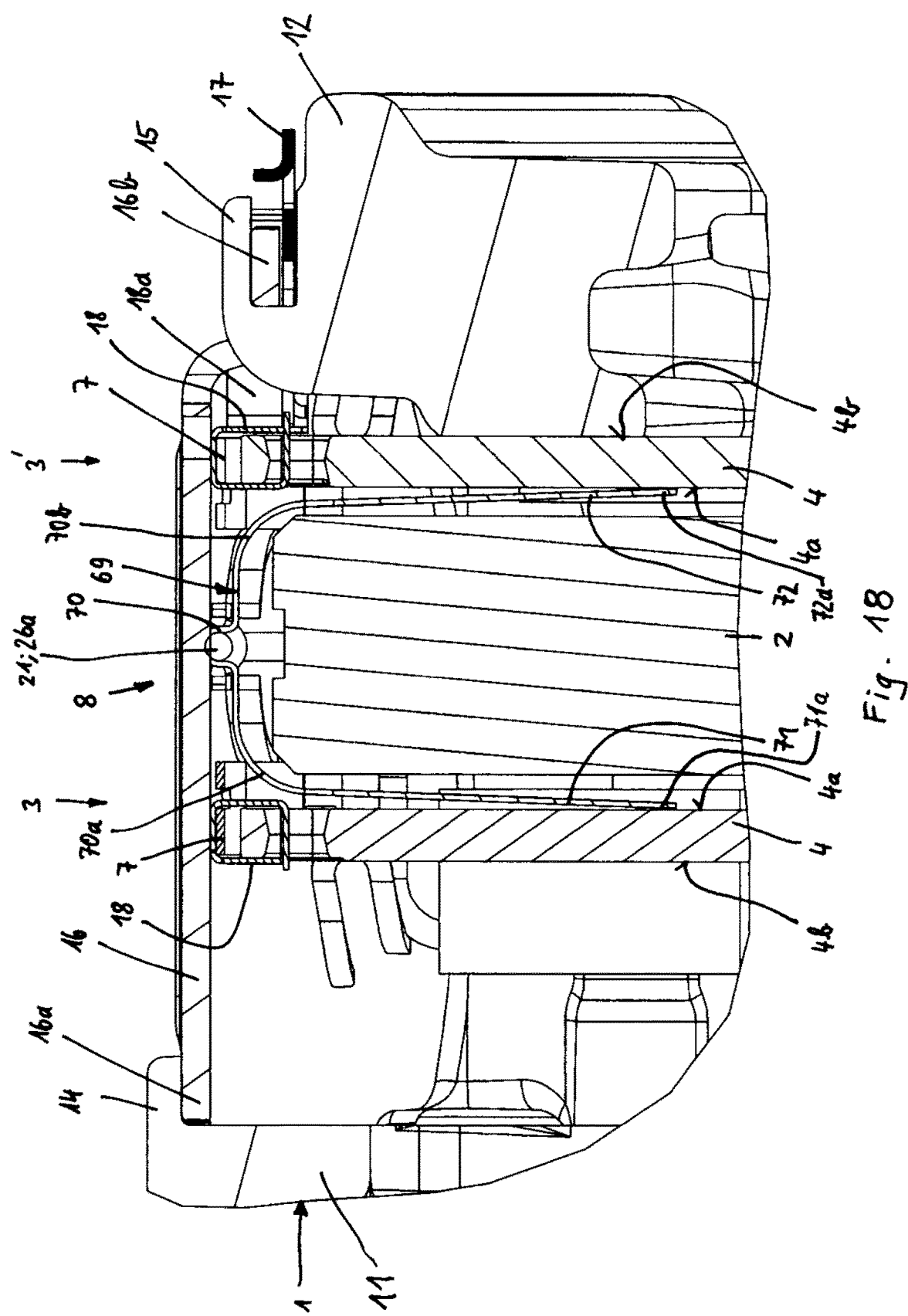
FIG. 18 shows a schematic sectional view of a further variant of the second function group of the resetting device.

FIG. 18 illustrates a schematic sectional view of a further variant of the second function group of the spreading device 8 a resetting element 69 in a sectional view in a plane, running through the brake disc axis of rotation 2*a*, of the disc brake with the brake pads 3, 3'.

In this variant, the resetting element 69 is of stirrup-like form with are two mutually oppositely situated spring arms 71, 72 in spring form, for example leaf and/or wire springs. Each spring arm 71, 72 is attached by means of its upper end in each case to a central section 70 via a connecting bend 70*a*, 70*b*. The central section 70 of the resetting element 69 is fastened to the central section 26*a* of the retaining bow 21 of the spreading device 8, wherein said central section 70 is for example bent around the central section 26*a*.

From a lower end of each connecting bend 70*a*, 70*b*, each spring arm 71, 72 extends downward in the direction of the brake disc axis of rotation 2*a* as far as into the region of the bottom side of each brake pad 3. Each spring arm 71, 72 has a free end with in each case one thrust-imparting limb 71*a*, 72*a*, and is arranged in each case in an elongate intermediate space between friction pad 5 and the pad side 4*b* of the pad carrier plate 4, wherein the thrust-imparting limbs 71*a*, 72*a* are each case in contact with the respective pad carrier plate 4.

In this embodiment, the spring arms 71, 72 of the resetting element 69 each exert a thrust force on the brake pads 3, 3' in the direction of the brake disc axis of rotation 2*a* pointing away from the brake disc 2, whereby, after every braking process, the brake pads 3 are acted on with a force for a resetting action in the lower region by the spring arms 71, 72 of the resetting element 69 as well as by the spring arms 20 of the spreading device 8.

Figure 19:
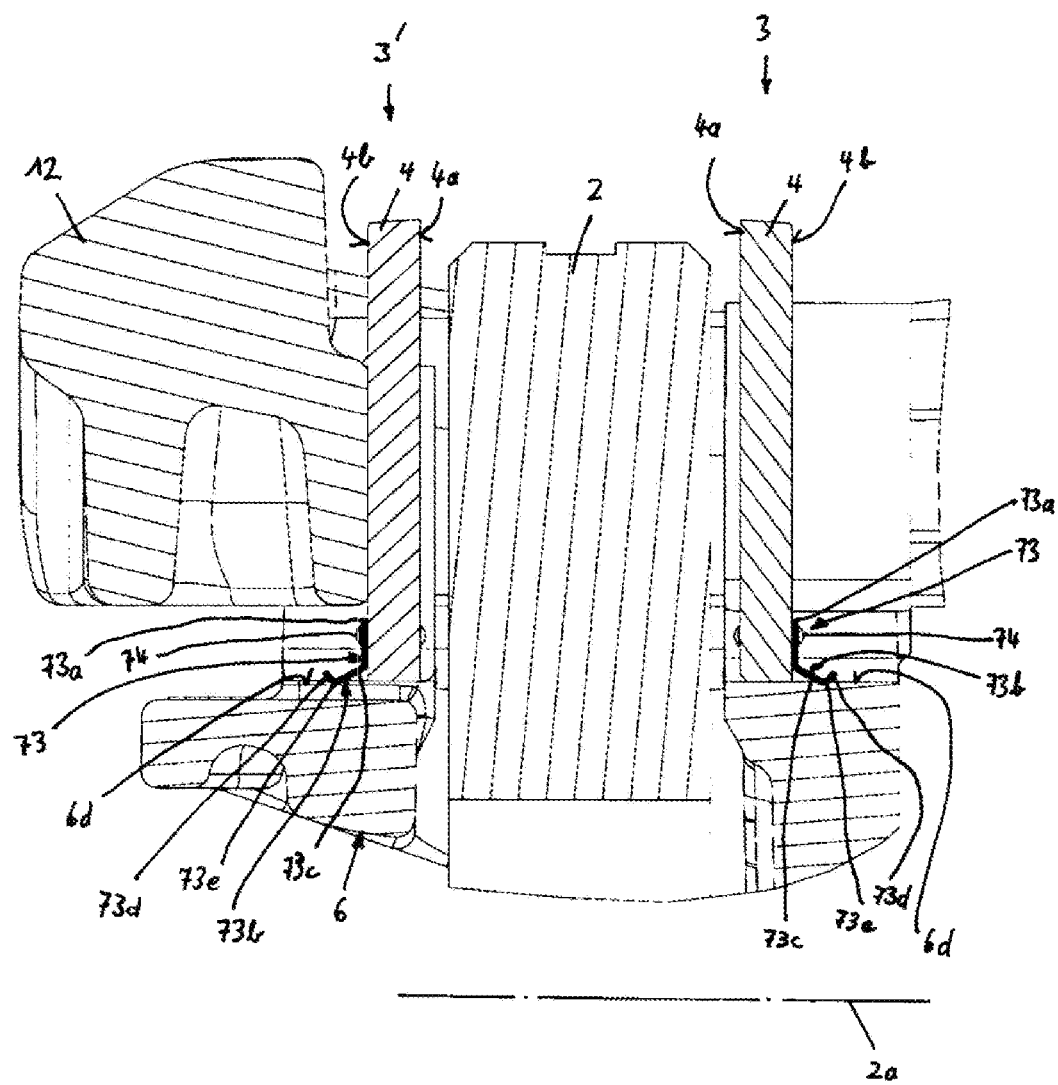
FIG. 19 shows a schematic detail sectional view of the disc brake according to the invention as per FIG. 1 with guide elements.

FIG. 19 shows a schematic detail sectional view of the disc brake 10 according to the invention as per FIG. 1 with guide elements 73.

Each guide element 73 has a fastening section 73a and a guide section 73b fastened thereto. The fastening section 73a is formed as a type of lug and transitions, at its bottom side, firstly into an arm 73c, which is bent out of a plane of the fastening section 73a, of the guide section 73b. Here, the arm 73c is bent up by approximately 45°. Attached to the free end of the downwardly bent-away arm 73c is an end section 73d which is bent up from a plane of the arm 73c by approximately 90° in the same bending direction as the arm 73c, wherein a bearing section 73e is formed.

The guide elements 73 are attached in the lower region of each pad carrier plate 4 of the brake pads 3, 3' such that the bearing sections 73d thereof lie on the respective pad slot base 6d (see also FIG. 11). Here, the fastening sections 73a are fastened in each case on the thrust side 4b of a respective pad carrier plate 4 by means of a fastening element 74, for example rivet. It may be provided that, on each pad carrier plate 4, a guide element 73 is arranged in the center, or multiple guide elements 73 are arranged so as to be distributed over the length of the pad carrier plate 4.

The guide elements 73 enlarge a bearing surface of the respective pad carrier plate 4 on the pad slot base 6d in the direction of the brake disc axis of rotation 2a. Here, the guide elements 73 do not exert a force on the associated brake pads 3, 3', but rather in each case define for the brake pads 3, 3' a certain preferred direction in order to prevent tilting of the brake pads 3, 3' when the brake pads 3, 3', for example by means of the spring arms 20 of the spreading device 8, as a result of their exertion of force on the top side of the pad carrier plates 4, are moved back after a braking process as already discussed above.

LIST OF REFERENCE DESIGNATIONS

1 Brake caliper
2 Brake disc
2a Brake disc axis of rotation
3, 3' Brake pad
4 Pad carrier plate
4a Pad side
4b Thrust side
4c Contact surface
4d, e Side section
5 Friction pad
6 Brake carrier
6a Fastening side
6b Bearing receptacle
6c Bridge connector
6d Pad slot base
7 Pad retaining spring
8 Spreading device
9 Opening
10 Disc brake
11 Application section
12 Caliper rear section
12a Retaining section
13 Tension strut
14, 15 Retaining section
16 Pad retaining stirrup
16a, 16b Retaining end
17 Securing element
18 Clip element
18a Clip
19 Base plate
20 Spring arm
20a Thrust section
20b Connecting section
20c Hood-type connector
20d End section
20e Bearing surface
21 Retaining bow
21a Stirrup
21b Securing means
22 Elongated hole
23 Longitudinal connector
24 Pin
25 Brake carrier horn
25a Bore
26 Center limb
26a Central section
26b Widened portion
26c Securing element
26d Groove
27 End leg
27a Fastening section
28 End section
29 Lug
30 Peg
31 Projection
32 Retaining peg
33 Retainer
33a Recess
34 Retainer
35 Retaining angle piece
35a Limb
36 Retainer
36a Retaining opening
37, 38, 39 Retaining stirrup
37a, 38a, 39a Retaining opening
40 Resetting element
41 Central section
42 Spring arm
43 Fastening section
44 Lug
44a Fastening hole
45 Spring arm
45a Central section
45b End section
46 Resetting element
47 Spring arm
47a Clamping end
47b Connection
48 Spring arm
48a Connection
49 Fastening section
49a Opening
50 Resetting element
51, 54, 56 Longitudinal member
51a, 51a, 56a Gripping section
52, 53, 55 Transverse connector
57 Spring body
58 Longitudinal member
58a Transverse connector
58b, 58c End section
59 Retaining means
59a Retainer section 59b Retainer lug
60 Spring body
60a End section
60b Fastening section
61 Spring plate
61a End section
61b Fastening section
62 Resetting element
62 Central section
63a Connecting section
64 Spring arm
64a Spring end
65 Connecting section
65a Arm
66 Spring arm
66a Clip end
67 Resetting element
68 Spring body
68a Clamping end
68b Claw end
69 Resetting element
70 Central section
70a, 70b Connecting bend
71, 72 Spring arm
71a, 72a Thrust-imparting limb
73 Guide element
73a Fastening section
73b Guide section
73c Arm
73d End section
73e Bearing section
74 Fastening element
AS Run-out side
ES Run-in side The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a commercial vehicle, comprising:
a brake caliper which engages over a brake disc and which is in the form of a sliding caliper and which is fastened to a positionally static brake carrier and which has a central opening over the brake disc,
two brake pads which are arranged in the brake caliper and which are movable in opposite directions and which have in each case one pad carrier plate and one friction pad fastened thereto and of which an action-side or application-side brake pad can be pressed against the brake disc by way of an application device via at least one brake plunger, and
at least one resetting device by which the brake caliper can be reset after a braking-induced displacement and release of the brake,
wherein
the at least one resetting device has a spreading device which engages on the opposite brake pads and which acts equally counter to the respective application direction and which has resilient spreading elements which engage on the respective pad carrier plate,
the spreading device is arranged in the central opening,
the spreading elements engage, outside the friction pads, directly or indirectly on at least two abutment regions, arranged spaced apart from one another relative to the center, of the brake pads, the abutment regions have in each case one abutment surface and one bearing surface on which the spreading elements are movably arranged,
the spreading elements are spring arms, of which in each case two bear against an associated pad carrier plate, wherein the spring arms are connected to one another in the central region of the opening,
the spring arms are connected to a retaining bow which is attached to the brake carrier,
the retaining bow is connected to two brake carrier horns which delimit a pad slot, the retaining bow being of C-shaped form with two mutually oppositely situated end limbs and with a center limb, and
the end limbs have in each case one fastening section which is inserted into and fastened in receptacles, which correspond to the fastening section, in the respective brake carrier horn.

2. The disc brake as claimed in claim 1, wherein the spreading elements, proceeding from a central region in the center of the opening, extend from the inside outward to the abutment regions arranged spaced apart from one another with respect to the center.

3. The disc brake as claimed in claim 2, wherein the spreading elements, proceeding from a central region in the center of the opening, extend from the inside outward to the abutment regions arranged uniformly spaced apart from one another with respect to the center.

4. The disc brake as claimed in claim 3, wherein the central region of the opening extends, to both sides of a virtual center of the opening, approximately parallel to the plane of the brake disc over a length in a range from 30 to 50% of a longitudinal axis of the opening.

5. A disc brake for a commercial vehicle, comprising:
a brake caliper which engages over a brake disc and which is in the form of a sliding caliper and which is fastened to a positionally static brake carrier and which has a central opening over the brake disc,
two brake pads which are arranged in the brake caliper and which are movable in opposite directions and which have in each case one pad carrier plate and one friction pad fastened thereto and of which an action-side or application-side brake pad can be pressed against the brake disc by way of an application device via at least one brake plunger, and
at least one resetting device by which the brake caliper can be reset after a braking-induced displacement and release of the brake,
wherein
the at least one resetting device has a spreading device which engages on the opposite brake pads and which acts equally counter to the respective application direction and which has resilient spreading elements which engage on the respective pad carrier plate,
the spreading device is arranged in the central opening,
the spreading elements engage, outside the friction pads, directly or indirectly on at least two abutment regions, arranged spaced apart from one another relative to the center, of the brake pads, the abutment regions have in each case one abutment surface and one bearing surface on which the spreading elements are movably arranged,
the spreading elements are spring arms, of which in each case two bear against an associated pad carrier plate, wherein the spring arms are connected to one another in the central region of the opening, the spring arms are connected to a retaining bow which is attached to the brake carrier, the retaining bow is connected to two brake carrier horns which delimit a pad slot, the retaining bow being of C-shaped form with two mutually oppositely situated end limbs and with a center limb, the spring arms are formed as two pairs of spring arms, wherein the pairs are arranged opposite one another in a transverse direction of the opening such that they are fastened by way of inner ends, which point toward the center of the opening, to the retaining bow, wherein their outer free ends interact with the pad carrier plate of the brake pads, and the inner ends of each pair of spring arms are connected in each case to a hood-shaped connector, wherein the hood-shaped connectors are bent around a central section of the retaining bow and are attached rotatably and displaceably to the central section, which has a circular cross section.

6. The disc brake as claimed in claim 5, wherein each spring arm is formed, at the end, with a thrust section which, in its longitudinal direction, is formed with an elongated hole which is a guide section of the spring arm of the spreading device.

7. The disc brake as claimed in claim 6, wherein each thrust section lies in each case on the respective bearing surface of the respective pad carrier plate, wherein the elongated holes of each thrust section interact in each case with the respective abutment surface of the pad carrier plate.

8. The disc brake as claimed in claim 7, further comprising:
a pin fixedly connected to the pad carrier plate at each respective bearing surface, the pin being configured to interact with the respective elongated hole of the respective spring arm guide section,
wherein the respective bearing surfaces run in each case tangentially with respect to the brake disc and lie in a plane.

9. A brake pad set, comprising:
at least two brake pads with in each case one pad carrier plate and with a friction pad attached to the pad carrier plate, the at least two brake pads being configured to be installed into a brake caliper of disc brake, and
a spreading device configured to be arranged in a central opening of the brake caliper and to engage opposite ones of the at least two brake pads and acts equally counter to respective brake pad application directions, the spreading device having resilient spreading elements configured to engage on the respective pad carrier plate,
wherein
the pad carrier plates have, outside the friction pads and on one side in a center region or at at least two abutment regions arranged spaced apart from one another relative to the central region, in each case one abutment surface and one bearing surface,
the spreading elements are configured to engage, outside the friction pads, directly or indirectly on respective ones of the at least two abutment regions of the brake pads,
the spreading elements are spring arms, of which in each case two bear against the respective pad carrier plate, wherein the spring arms are connected to one another in the central region of the spreading device,
the spring arms are connected to a retaining bow configured to be located on a brake carrier of the disc brake, and
the retaining bow is configured to be connected to two brake carrier horns which delimit a pad slot, the retaining bow being of C-shaped form with two mutually oppositely situated end limbs and with a center limb, and
the end limbs have in each case one fastening section which is configured to be inserted into and fastened in receptacles, which correspond to the fastening section, in the respective brake carrier horn.

10. The brake pad set as claimed in claim 9, wherein the pad carrier plates are equipped, in the lower region on their thrust sides, with at least one guide element.

11. A disc brake for a commercial vehicle, comprising:
a brake caliper which engages over a brake disc and which is in the form of a sliding caliper and which is fastened to a positionally static brake carrier,
two brake pads which are arranged in the brake caliper and which are movable in opposite directions and which have in each case one pad carrier plate and one friction pad fastened thereto and of which an action-side brake pad can be pressed against the brake disc by way of an application device via at least one brake plunger, and
at least one resetting device by which the brake caliper can be reset after a braking-induced displacement and release of the brake,
wherein
the at least one resetting device is composed of a spreading device which engages on the mutually oppositely situated brake pads and which acts equally counter to the respective application direction, the spreading device having resilient spreading elements which engage on the respective pad carrier plate,
the resilient spreading elements are spring arms, of which in each case two bear against an associated pad carrier plate, wherein the spring arms are connected to one another in the central region of the opening,
the spring arms are connected to a retaining bow which is attached to the brake carrier, and
the retaining bow is connected to two brake carrier horns which delimit a pad slot, the retaining bow being of C-shaped form with two mutually oppositely situated end limbs and with a center limb, and
the end limbs have in each case one fastening section which is inserted into and fastened in receptacles, which correspond to the fastening section, in the respective brake carrier horn.

12. The disc brake as claimed in claim 11, wherein the spreading elements engage, outside the friction pads, on one side in the center region, or at at least two abutment regions arranged spaced apart from one another uniformly relative to the center.

* * * * *